(12) United States Patent
Pitwon

(10) Patent No.: US 9,676,154 B2
(45) Date of Patent: Jun. 13, 2017

(54) APPARATUS FOR MAKING AN OPTICAL WAVEGUIDE

(71) Applicant: Xyratex Technology Limited, Havant (GB)

(72) Inventor: Richard Charles Alexander Pitwon, Fareham (GB)

(73) Assignee: XYRATEX TECHNOLOGY LIMITED—A SEAGATE COMPANY, Havant (GB)

(*) Notice: Subject to any disclaimer, the term of this patent is extended or adjusted under 35 U.S.C. 154(b) by 163 days.

(21) Appl. No.: 14/692,272

(22) Filed: Apr. 21, 2015

(65) Prior Publication Data

US 2015/0224726 A1    Aug. 13, 2015

Related U.S. Application Data

(62) Division of application No. 13/354,755, filed on Jan. 20, 2012, now Pat. No. 9,044,907.

(51) Int. Cl.
*B29C 35/08* (2006.01)
*B29D 11/00* (2006.01)
*G02B 6/138* (2006.01)
*G02B 6/12* (2006.01)
*B29K 105/00* (2006.01)
*B29K 105/24* (2006.01)

(52) U.S. Cl.
CPC .. *B29D 11/00682* (2013.01); *B29D 11/00663* (2013.01); *G02B 6/138* (2013.01); *B29K 2105/0002* (2013.01); *B29K 2105/0005* (2013.01); *B29K 2105/24* (2013.01); *B29K 2995/0031* (2013.01); *G02B 2006/12119* (2013.01)

(58) Field of Classification Search
CPC ............ B29C 2035/0838; B29C 65/16; B29C 65/7473; B29C 65/0051; B29C 65/0066; B29C 2791/009
USPC ....................................................... 425/174.4
See application file for complete search history.

(56) References Cited

U.S. PATENT DOCUMENTS

| | | |
|---|---|---|
| 5,932,397 A | 8/1999 | Mustacich |
| 6,038,240 A | 3/2000 | Deutsch et al. |
| 6,226,126 B1 | 5/2001 | Conemac |

(Continued)

OTHER PUBLICATIONS

Payne, "Breakthrough Innovations in UV/Visible Light Curing Materials and Systems," Presentation by Ellsworth Adhesives, 35 pages (undated).

(Continued)

*Primary Examiner* — Joseph S Del Sole
*Assistant Examiner* — Thukhanh T Nguyen
(74) *Attorney, Agent, or Firm* — Hollingsworth Davis, LLC

(57) ABSTRACT

There is provided a method of making an optical polymer waveguide having an arbitrary refractive index profile, the method including: a) providing a first input optical beam having a first beam intensity profile and a second input optical beam having a second beam intensity profile; b) combining the first and second input optical beams to form an output optical beam having an output beam intensity profile; and c) forming the optical waveguide on a substrate by: exposing the optical materials of the waveguide to the output optical beam; and curing the optical materials using said output optical beam.

17 Claims, 14 Drawing Sheets

(56) References Cited

U.S. PATENT DOCUMENTS

| | | | |
|---|---|---|---|
| 6,703,188 B1 | 3/2004 | Kagami et al. | |
| 7,394,479 B2 * | 7/2008 | Assa | B41J 2/442 |
| | | | 347/246 |
| 2002/0135543 A1 | 9/2002 | Kitamura et al. | |
| 2003/0011672 A1 | 1/2003 | Emge et al. | |
| 2004/0131320 A1 | 7/2004 | Inui et al. | |
| 2013/0187301 A1 | 7/2013 | Pitwon | |

OTHER PUBLICATIONS

Schroder et al., "Glass Panel Processing for Electrical and Optical Packaging," Electronic Components and Technology Conference, IEEE, 2011, pp. 625-633.

Schafer et al., "Two-photon absorption cross-sections of common photoinitiators," Journal of Photochemistry and Photobiology A: Chemistry 162, 2004, pp. 497-502.

Liang et al., "Writing Parameters for 3D Refractive Index Structures in Polymethyl Methacrylate Using Femtosecond Radiation at 400 nm," JLMN—Journal of Laser Micro/Nanoengineering, vol. 5, No. 1, 2010, pp. 68-73. RR Katherine J. Schafer et al., Two-photon absorption cross-sections.

Search Report from GB Application No. GB1300811.5 dated May 21, 2013.

\* cited by examiner

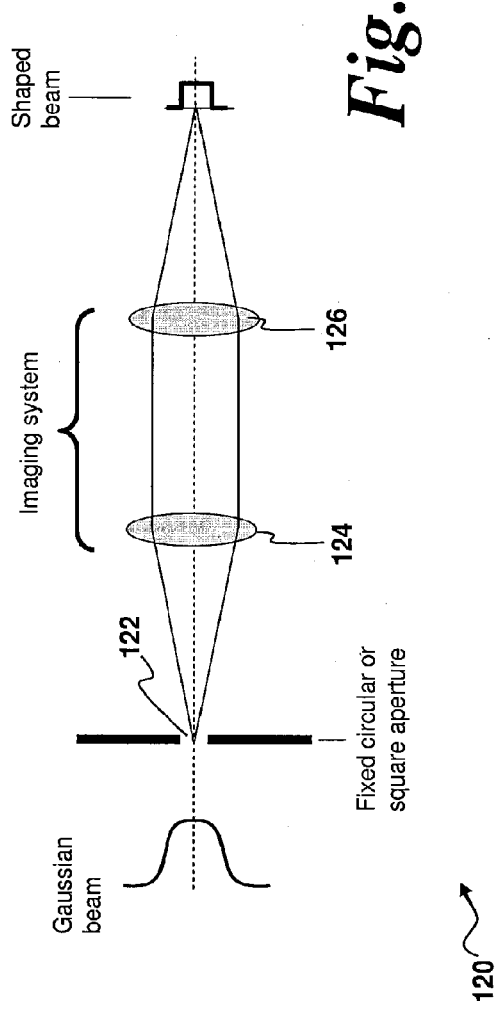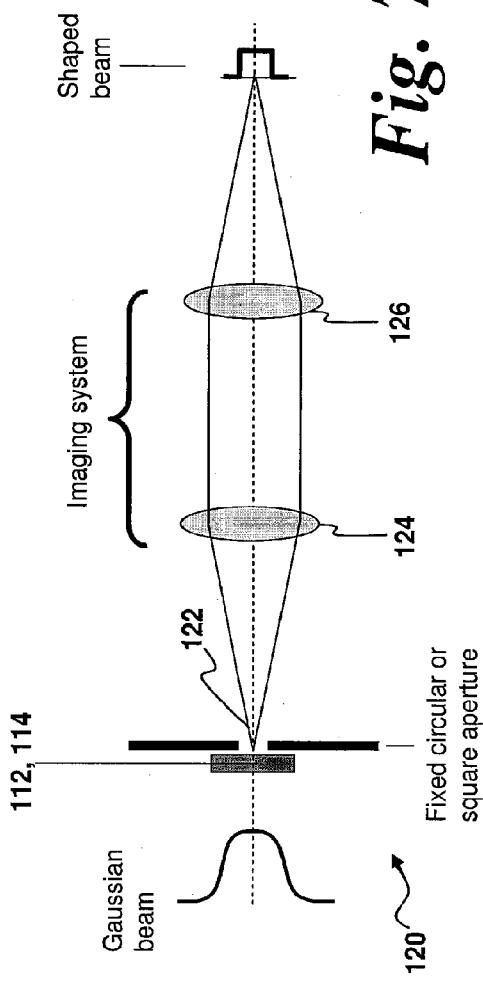

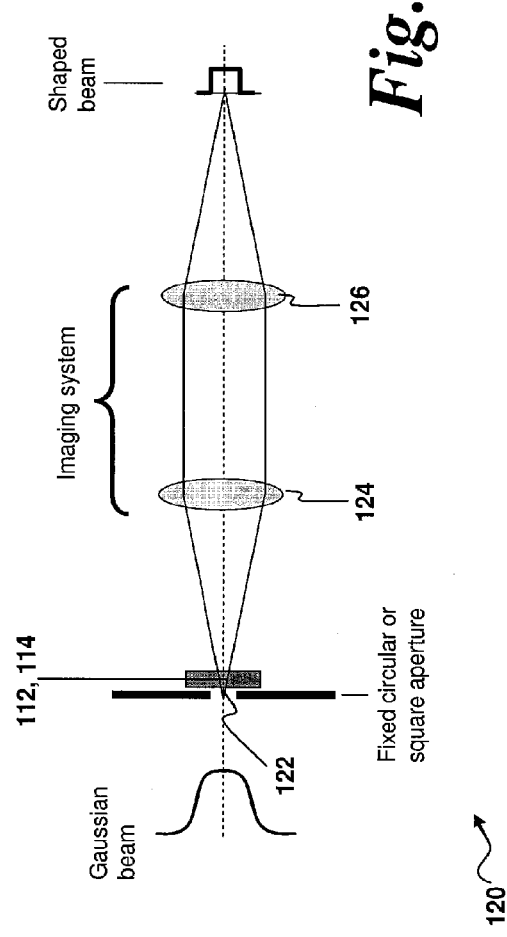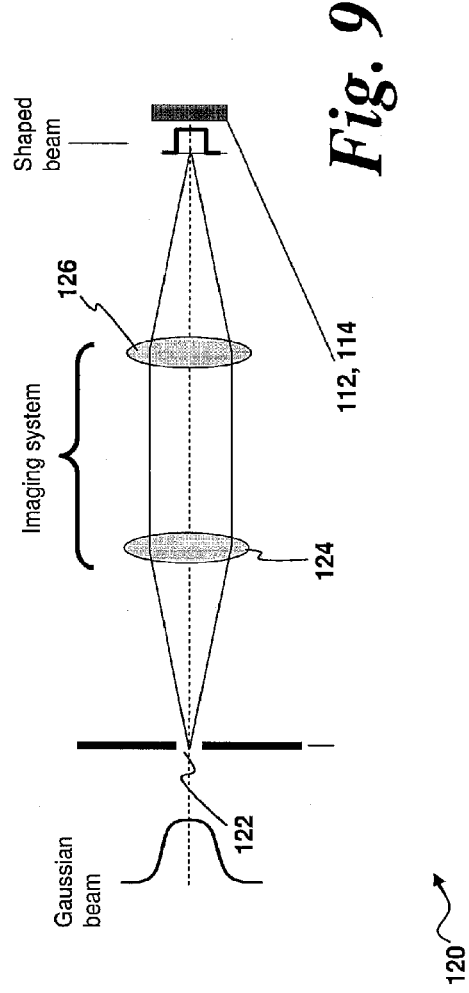

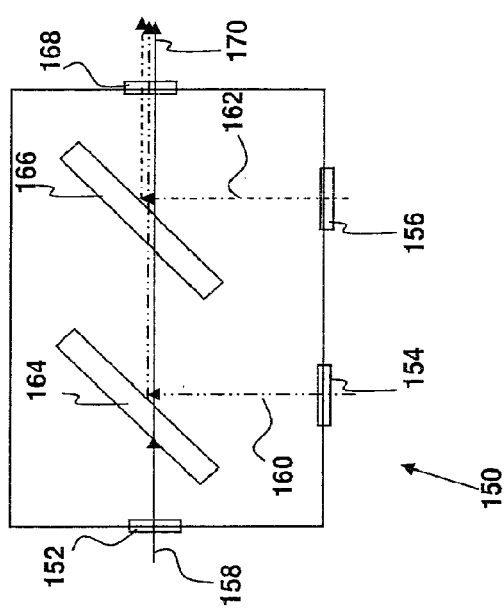
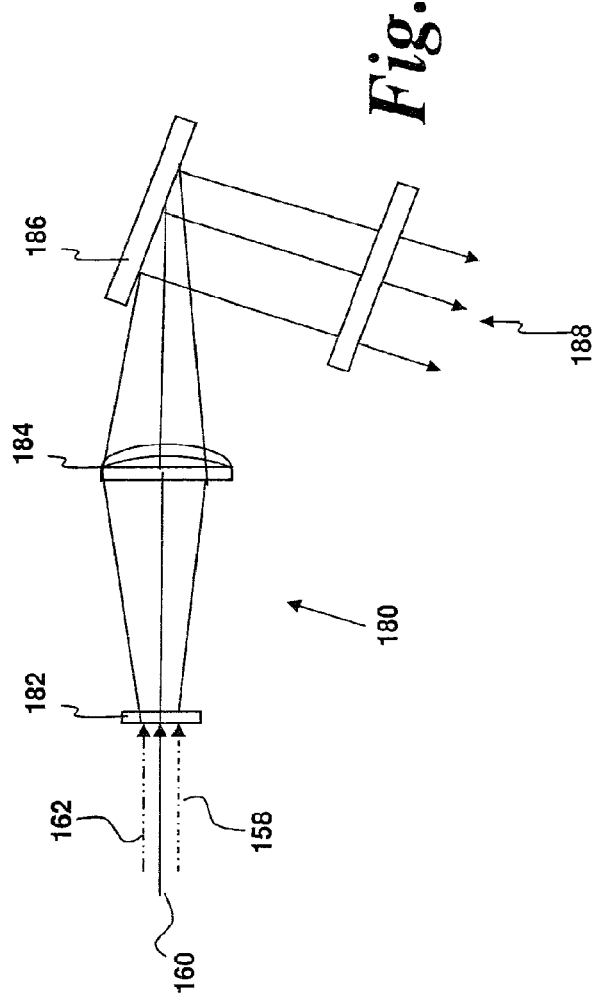

1

APPARATUS FOR MAKING AN OPTICAL WAVEGUIDE

CROSS-REFERENCE TO RELATED APPLICATIONS

This application is a divisional of U.S. application Ser. No. 13/354,755, filed on Jan. 20, 2012, the content of which is incorporated by reference in its entirety.

The present invention relates to a method of, and apparatus for, fabricating an optical waveguide. More particularly, the present invention relates to a method of, and apparatus for, fabricating an optical polymer waveguide having an arbitrary refractive index profile.

The present invention relates, in specific embodiments, to optical channels including optical polymer waveguides. In the context of the present application, the term "waveguide" is to be interpreted as relating to a channel or member for carrying an optical signal. In other words, an optical waveguide is a physical structure that is operable to guide electromagnetic radiation (generally in the UV/Visible/IR wavelength range). A common type of optical waveguide is an optical fibre.

However, optical waveguides are also applicable for use in many other fields and applications. For example, optical waveguides may be used as components in integrated optical circuits. As data rates are increased in data communication systems, embedded optical communications channels on printed circuit boards within computer systems are becoming increasingly attractive due to the inherently higher bandwidth capacity which is achievable in comparison to conventional copper connections.

Such waveguides can be formed from a number of materials. Glass ($SiO_2$) waveguides have been demonstrated, which comprise a core of doped silica with silica cladding such as those set out in "Glass panel processing for electrical and optical packaging" Schroder, H et al, Electronic Components and Technology Conference (ECTC), 2011 IEEE $61^{st}$ Pages 625-633. However, such structures are limited by a large minimum bend radius and are as such impractical to integrate into densely populated electro-optical circuit boards. Lithium Niobate ($LiNbO_3$) and Silicon (Si) are also used as waveguide materials. However, such materials are also difficult to integrate into high-density architectures such as on an electro-optical printed circuit board (OPCB) and are expensive and challenging to fabricate.

An alternative technology is polymer waveguides. Such waveguides comprise a waveguide core of optically transparent polymer surrounded by cladding, which must comprise a material of lower refractive index, which could include another optical polymer of lower refractive index; air; or silica. Such materials have the advantage of ease of fabrication and can be integrated into high density channel layouts on a substrate such as an optical PCB.

Optical polymers can readily be formed into planar single-mode, multimode, and micro-optical waveguide structures ranging in dimensions from under a micrometer to several hundred micrometers. Optical polymers can generally be grouped into classes such as thermoplastics, thermosets or photopolymers. Waveguides can be formed by photolithography, laser direct imaging (LDI) or laser direct writing, reactive ion etching, laser ablation, moulding, or embossing. The present invention focuses on the use of laser direct imaging. Waveguide performance depends strongly on the quality of the waveguide surfaces such as the core sidewalls. High surface roughness or defects become the strongest contributor to optical scattering loss along a low quality waveguide. In the past photolithography has been the preferred method of waveguide fabrication as it enables very high quality structures to be produced through high resolution masks e.g. e-beam masks. However Laser Direct Imaging technology has evolved significantly over the past few years and can now be used to create waveguides of comparable quality. This is significant as the clear advantage of laser direct writing over photolithography is removing the reliance on expensive photo-masks and being able to directly programme waveguide layouts into the system.

It is known to fabricate polymer waveguides using ultraviolet (UV) curing techniques. This approach involves applying UV radiation to resins or polymers to cause photopolymerization thereof. In a photo-polymerization reaction, a monomer (comprising a single organic unit) or an oligomer (a molecule comprising a small number of organic units) is converted, or cross-linked, to form a solid cross-linked polymer.

This is achieved using a photo-polymerization initiator compound forming part of the mixture. The initiator compound is excited by the absorption of photons, resulting in either cleavage, Hydrogen abstraction, or electron transfer. Therefore, when the monomer/oligomer/initiator mixture is excited by photons of a specific wavelength, substances such as radical molecules or hydrogen ions are generated. The generated radical molecules and hydrogen ions, attack the oligomer and/or monomer units, resulting in a three-dimensional polymerization or cross-linking reaction taking place.

A liquid-state curable resin mixture (which comprises monomer and oligomer units and an initiator) is usually cured by the following steps:
1. Photopolymerization initiators absorb photons;
2. These photopolymerization initiators that have absorbed the photons are excited through photolysis;
3. Activated photo-polymerization initiators react with the oligomers or monomers through decomposition; and
4. A chain reaction cross-linking the oligomers and monomers proceeds, resulting in a three-dimensional cross-linking reaction which increases the molecular weight of the polymer and curing the mixture.

When photons are used to cure the resin, the factors of the irradiation intensity (i.e. irradiation energy per unit area) (measured in $mW/cm^2$) and exposure (measured in $mJ/cm^2$) are important. In addition, the excitation wavelength must be chosen such that the photons are absorbed by the initiator compounds in order for the cross-linking operation to proceed. A fully cross-linked polymer will have a substantially constant refractive index throughout its bulk.

Optical channels are often required to undergo a number of direction changes, such as when they form part of an optical layout configuration on an optical PCB. However, whenever an optical channel undergoes a change of direction, an optical bend transition loss occurs. This comprises a loss of signal power which occurs when the radius of curvature of a waveguide changes along its axis and is due to the change in supportable optical modes in the new waveguide segment.

This effect is strongest when the radius of curvature is suddenly reduced along the course of a waveguide, such as when an optical signal propagates from a straight waveguide segment to a bent segment. This is particularly relevant for optical PCBs, where a large number of sharp direction changes may be required due to the need to circumnavigate certain features inherent to the PCB (such as through vias, clearances or components) and to accommodate a large optical channel densities on the PCB.

Optical bend transition loss is amongst the largest loss mechanisms in planar optical channels and, therefore, is a significant factor in restricting the design of optical waveguides in terms of the trade-off between the number of bends, radius of curvature of bends and the length of the waveguide. In effect, in-plane bend transition loss is a technology inhibitor for embedded planar optical waveguides and, in particular, for optical PCBs.

FIGS. 1 and 2 illustrate examples of optical waveguides. FIG. 1 shows a schematic representation of a waveguide core 2 surrounded by cladding 4. The waveguide core 2 comprises a straight section 6 followed by a curved section 8.

FIG. 1 also includes schematic views 10 and 11 of a supported optical mode (in this case the fundamental mode) of an optical signal propagating along the waveguide. As can be seen, in the straight section 6, the mode 10 propagates through the centre of the waveguide core. As the optical signal continues into the curved section the optical signal energy is transferred from the fundamental mode to the higher order mode(s) 11 along the outer bend region. In effect, the mode 10 is forced into the outer region of the curved waveguide core such that it is no longer supported centrally. This transfer of the optical signal energy in mode 10 from the centre of the core to higher order modes in a different outer region thereof is the same effect as would occur if the waveguide remained straight but the refractive index profile varied asymmetrically as shown in graph 14.

This has the deleterious effect that the mismatches in supportable mode profiles between sections with different radii cause optical loss when optical energy propagates from a first section to a second section wherein some of the modes supported in the first section are no longer supported in the second section.

For example, to consider the problem from a optical ray point of view, when an optical signal transitions from a straight waveguide section to a bent waveguide section, a fraction of the signal energy is expelled as the angles formed by some of the light rays with the waveguide boundary are no longer at or below the critical angle required to satisfy the conditions for total internal reflection within the waveguide. This is known as the bend transition loss. Accordingly any reduction in the radius of curvature along the waveguide typically gives rise to a leakage of optical energy from the waveguide.

The number of bends that can be introduced in a waveguide is also limited since if more than a certain number are introduced then the effect of bend loss can reduce the quality and power of the signal to a level which is unacceptable for reliable data transfer. In addition, the bend radii that can be applied to embedded optical channels are also subject to constraints since the smaller the bend radius, the higher the bend loss. Such restrictions are clearly undesirable and naturally impact on the use of embedded optical channels in high density electro-optical PCBs in data communication systems such as rack scale data storage, high performance computing or supercomputing systems.

FIG. 2 shows a similar view to that of FIG. 1 except in this case the waveguide has a typical graded-index profile, whereby the refractive index of the core varies parabolically across the core and symmetrically around the centre of the core. However, graded index waveguides can also be prone to transition losses when there is a sudden reduction in bend radius, though to a lesser degree than conventional step-index waveguides. A transfer of modal energy from lower order (central) modes to higher order modes can be observed when a signal transfers from a straight section 16 to a curved section 18.

A solution to the above problem has been proposed in the form of a waveguide having a refractive index which varies asymmetrically across the width of the waveguide. Simulations have shown that the loss in optical signal power propagating along waveguide bend transition points can be strongly reduced if asymmetric perturbations are applied to the transverse refractive index profile of the waveguide in curved sections. Examples of this are illustrated in FIGS. 3 and 4.

Referring firstly to FIG. 3, a waveguide 24 is provided having a straight section 26 and a curved section 28. The curved section may be considered a cylindrically curved waveguide. As shown, in this configuration a perturbation is applied to the transverse refractive index profile of the bent waveguide segment to compensate for the redistribution of modal energy during the transition.

The refractive index perturbation is preferably applied to both the waveguide cladding and the waveguide core since the containment characteristics of the waveguide are affected by the refractive index difference between the cladding and the core (henceforth referred to as the delta) and it is preferable to maintain a consistent delta as large variations can impact on certain waveguide performance characteristics such as dispersion. Waveguide dispersion determines the degree of pulse spreading in the waveguide and how far and how fast a signal can be sent before signal integrity is irretrievably impaired. Dispersion increases with the numerical aperture of the waveguide, which in turn increases with the delta between core and cladding.

This is particularly relevant when dealing with tighter bends requiring larger asymmetric index perturbations. If, for example, the required perturbations were applied to just the core and not the cladding, then the delta on the inner bend would be significantly larger than that on the outer bend, which would adversely affect signal integrity.

In general, and as can be seen in FIG. 3, the outer core edge 42 is an inflection point where the effective index is the same. The effective index decreases moving radially toward the centre of the curve from this point and decreases moving radially away from the centre of the curve. Therefore in order to compensate, the required perturbed index must increase moving radially toward the centre of the curve from this point and decrease moving radially away from the centre of the curve.

The refractive index profile for the waveguide 34 includes both cladding sections 36 and a core section 38. In this example, the waveguide has a typical step-index index profile, whereby the index of the core section 38 and cladding sections 36 have a flat profile. The required perturbation is applied to the refractive index of both the cladding and the core in the curved section 28 of the waveguide, with respect to that of the straight section 26.

The effective refractive index shift, signifying the profile, which applied to a straight waveguide segment, would cause it to behave like the curved waveguide 28, is shown with a dashed line. The refractive index required to compensate for the effect of the bend is shown in a solid line superposed in the same graph. It can thus be shown intuitively how the purpose of the required perturbation is to cancel the effective refractive index shift thus causing the waveguide to behave like a straight segment with the same profile as that of the preceding straight waveguide segment. Therefore transition losses are eliminated or significantly reduced as the signal sees no change in boundary conditions (or effective refractive index profile) as it propagates from one segment to another.

FIG. 4 shows a similar embodiment to that of FIG. 3, except in this case the waveguide is not a step-index waveguide, but rather a graded-index waveguide, whereby the index of the core section varies parabolically around the centre of the core, while the cladding has a flat index profile. As is the case for FIG. 3, the refractive index perturbation applied to the curved section counteracts the effect of the bend and thus eliminates bend transition loss as the optical signal propagates from the straight section to the curved section.

It is envisaged that, a number of complex routing geometries may be required for a waveguide on an optical PCB. Therefore, such a waveguide will require correspondingly complex transverse refractive index profiles at different points along its axis. Moreover, the transverse refractive index profile may be required to change continuously along the length of the waveguide. Fabrication of such a profile in an optical polymer is a non-trivial problem.

Attempts to vary the refractive index of a polymer waveguide have met with limited success. Whilst a partially cross-linked polymer will have a different refractive index from a fully cross-linked polymer, techniques for exploiting this in a meaningful way do not currently exist. Beam shaping technology (such as filters which vary the intensity of the curing beam in the transverse direction) is not likely to give rise to significantly useful changes in refractive index due to the limited cross-linking responsivity of available optical materials to variations in curing intensity. Furthermore, such attempts may inadvertently lead to a variable curing profile in the depth direction because of the absorption of photons by the uppermost levels.

U.S. Pat. No. 5,932,397 discloses a multicolor lithographic process in which the wavelength-dependent variation of light penetration into a photosensitive polymer is used to provide three-dimensional control of the refractive index gradients in a polymer forming a waveguide. The disclosed method utilises a lithographic mask for defining the exposed area of the waveguide. However, in this implementation, utilising different wavelengths of light for different regions of the waveguide requires a different mask to be provided for each wavelength, resulting in limited flexibility to change the exposure pattern and more complicated and lengthy processing procedures.

Therefore, to date, a technical problem in the art is that it is difficult to manufacture optical polymer waveguides having complex and varying refractive indices of sufficient index variability using known methods.

The present invention relates to a method of fabricating polymer optical waveguides with arbitrary cross-sectional (transverse) refractive index profiles across the core of the waveguide, which can also be dynamically altered along the length or axis of the waveguide.

According to a first aspect of the present invention, there is provided a method of making an optical polymer waveguide having an arbitrary refractive index profile, the method comprising: a) providing a first input optical beam having a first beam intensity profile and a second input optical beam having a second beam intensity profile; b) combining the first and second input optical beams to form an output optical beam having a summed output beam intensity profile; and c) forming the optical waveguide on a substrate by: d) exposing the optical materials of the waveguide to the summed output optical beam; and e) curing the optical materials using said summed output optical beam to form an optical polymer waveguide.

The technique comprises the superposition of a plurality of writing beams with varied parameters including curing wavelength, pulse frequency and intensity profile into a single writing beam though a beam combiner. This will enhance the degree of refractive index variation that can be achieved compared to using a single beam with a user defined intensity profile.

By providing such a method, waveguides with significantly enhanced performance can be fabricated on an optical PCB. Waveguides formed in this manner have lower waveguide loss, can support a greater number of tighter bends and suffer from less dispersion than conventional arrangements. Therefore, such arrangements have the advantages of higher density (due to an increased number of tighter bends), and significantly increased maximum allowable data-rates, which can be supported over a given length before inter-symbol interference occurs.

In one embodiment, the first and second beam intensity profiles are different.

In one embodiment, the summed output beam intensity profile is a superposition of the first and second beam intensity profiles.

In one embodiment, the method further comprises, subsequent to step b), f) passing the summed output optical beam through an optical intensity profiler.

In one embodiment, the first input optical beam comprises a laser beam having a first wavelength.

In one embodiment, the second input optical beam comprises a laser beam having a second wavelength.

In one embodiment, the first and second wavelengths are different.

In one embodiment, at least one of the first and second input optical beams comprises a pulsed laser beam having a pulse frequency and a duty cycle.

In one embodiment, each of the first and second input optical beams comprises a pulsed laser beam having a pulse frequency and a duty cycle.

In one embodiment, the pulse frequency and/or duty cycle of each input optical beam is different.

In one embodiment, step a) further comprises providing a third input optical beam having a third beam intensity profile and step b) comprises combining the first, second and third input optical beams to form the summed output optical beam.

In one embodiment, the third input optical beam comprises a laser beam having a third wavelength.

In one embodiment, the third wavelength is different from the first and second wavelengths.

In one embodiment, the third input optical beam comprises a pulsed laser beam having a pulse frequency and a duty cycle.

In one embodiment, at least one of the first and second input optical beams is passed through a beam focussing arrangement such that, when forming part of said summed output optical beam, said respective input optical beam is collimated or focussed to a specific region of the optical materials of the waveguide.

In one embodiment, the beam focussing arrangement comprises a lens arrangement.

In one embodiment, each of the first and second input optical beams is passed through a respective beam focussing arrangement.

In one embodiment, at least one of said first and second input optical beams comprises a summed input optical beam, the or each summed input optical beam comprising a plurality of combined optical beams.

In one embodiment, step a) further comprises providing a third input optical beam having a third beam intensity profile and step b) comprises combining the first, second and third input optical beams to form the summed output optical beam.

In one embodiment, the third input optical beam comprises a laser beam having a third wavelength.

In one embodiment, the third input optical beam comprises a summed input optical beam, the or each summed input optical beam comprising a plurality of combined optical beams.

In one embodiment, the third input optical beam comprises a pulsed laser beam having a pulse frequency and a duty cycle.

In one embodiment, step c) further comprises the step of: g) moving said summed output optical beam relative to said waveguide and/or substrate such that a length of cured waveguide is formed.

In one embodiment, the method further comprises: h) dynamically varying at least one of said first, second and/or summed output beam intensity profiles during said movement in order to produce a waveguide having a refractive index profile which varies along the length of the waveguide.

In one embodiment, at least one of said first, second and/or summed output beam intensity profiles are continuously varied electro-optically.

According to a second aspect of the present invention, there is provided an apparatus for making an optical polymer waveguide having an arbitrary refractive index profile, the apparatus comprising: a first light source for generating a first input optical beam having a first beam intensity profile; a second light source for generating a second input optical beam having a second beam intensity profile; a beam combining element for combining the first and second input optical beams to form an output optical beam having an output beam intensity profile; and an exposure region operable, in use, to receive the optical waveguide to be formed on a substrate and to enable exposure of the optical materials of the waveguide to the output optical beam such that the optical materials in the waveguide are cured using said output optical beam to form an optical polymer waveguide.

The apparatus comprises an arrangement whereby a plurality of writing beams with varied parameters including wavelength, pulse frequency and intensity profile can be superimposed into a single writing beam though a beam combiner. This will enhance the degree of refractive index variation that can be achieved compared to using a single beam with a user defined intensity profile.

Embodiments of the present invention will now be described in detail with reference to the accompanying drawings, in which:

FIG. 6 is a schematic diagram of a beam shaping arrangement suitable for use within the embodiment of FIG. 5 including a beam intensity profiler;

FIG. 7 is a schematic diagram of a beam shaping arrangement suitable for use with the embodiment of FIG. 5 including an alternative arrangement of a beam intensity profiler;

FIG. 8 is a schematic diagram of a beam shaping arrangement suitable for use with the embodiment of FIG. 5 including a further alternative arrangement of a beam intensity profiler;

FIG. 9 is a schematic diagram of a beam shaping arrangement suitable for use with the embodiment of FIG. 5 including a further alternative beam intensity profiler;

FIG. 12 is a schematic diagram of a beam combiner suitable for use within the embodiments of FIGS. 5 and/or 11;

FIG. 13 is a schematic diagram of an alternative beam combiner suitable for use with the embodiments of FIGS. 5 and/or 11;

Embodiments of the present invention provide a method of curing a polymer waveguide to achieve an arbitrary refractive index profile.

A method according to an embodiment of the present invention relies on optical radiation patterning of optically curable materials such as photosensitive polymers. In this example, the intensities of a plurality of light sources (such as lasers) are modified to deliver graded intensity beams which are then combined in a beam combiner. The resulting output beam is then projected onto the photosensitive material causing different amounts of cross-linking, i.e. curing, across the waveguide cross-section. Since the refractive index in a given locality of a cured polymer depends in part on the amount of cross-linking of the polymer material within that locality, a waveguide with a graded refractive index profile could be manufactured by appropriate tuning of the parameters (such as wavelength, intensity profile and pulse frequency) of the constituent optical curing beams to provide the desired amount of localised cross-linking in accordance with the parameter dependent reactivity of the polymer/monomer/oligomer/photopolymerization initiator mixture in which the waveguide is formed.

In one embodiment, laser writing is used and in the laser writing set-up, means to alter the intensity distribution of the writing or curing beam is provided such that the intensity distribution can be altered to match the required refractive index profile across the waveguide cross-section. This can be done in any convenient manner. Typically it is achieved by placing optical beam manipulators, which include, but are not limited to, neutral density filters (active or passive), electro-optic filters, beam shaping elements or adaptive optical devices, in the beam path.

If the optical beam manipulators, are dynamic i.e. can be changed actively/remotely by the user so that the intensity distribution can be switched instantaneously during the waveguide writing process from one intensity distribution to another, then the laser writing beam can write out complete waveguides composed of distinct or continuously varying waveguide segments, whereby the beam manipulators will be configured to provide a certain intensity distribution (and therefore write a certain cross-sectional refractive index profile), which depends on the geometry (such as the radius of curvature) on any given waveguide segment. In short, by using laser writing technology with dynamic (controllable) beam manipulators in the beam path, then the required cross-sectional refractive index profiles can be dynamically written during the waveguide patterning process.

Two Beam Combiner

Figure 1:
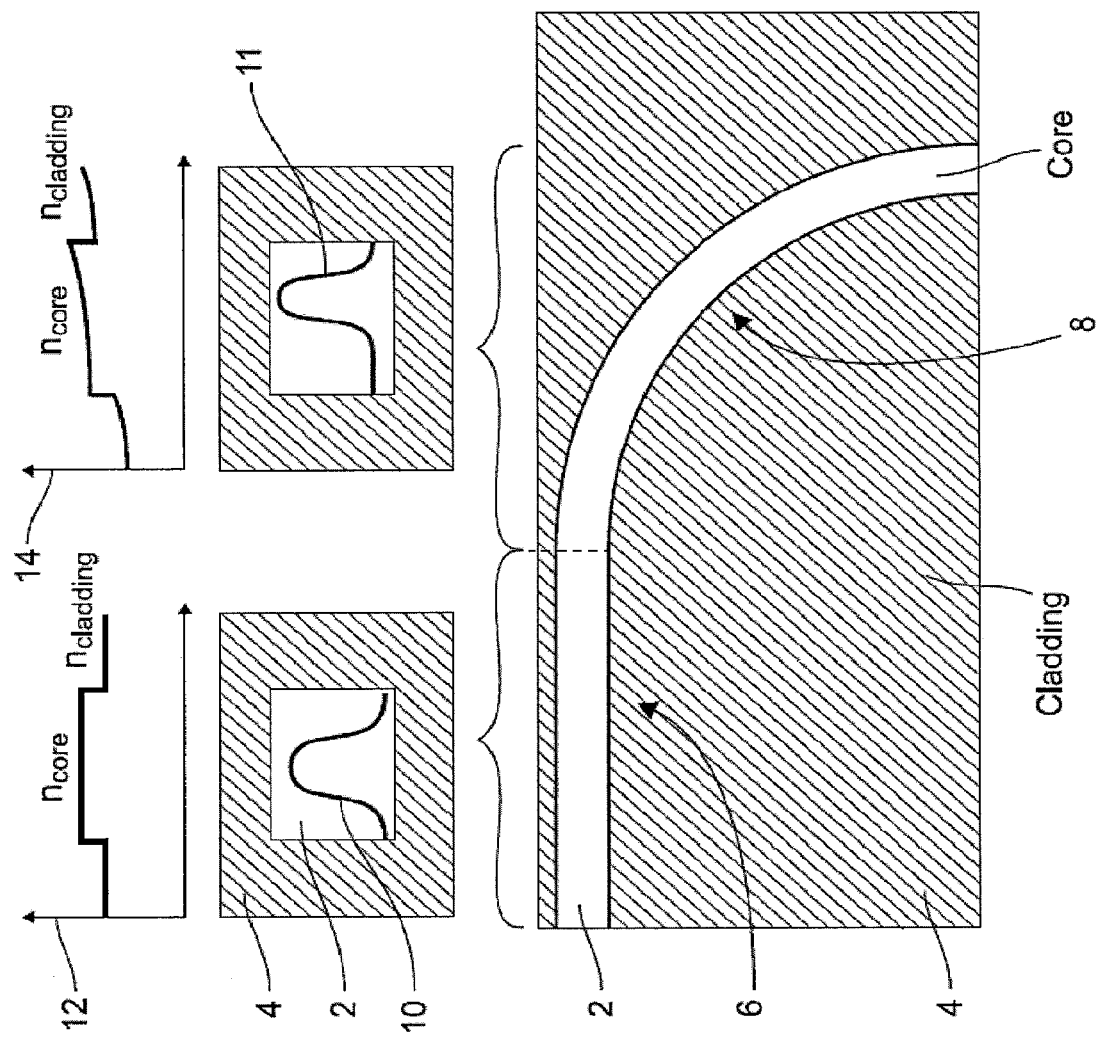
FIG. 1 is a schematic diagram of a waveguide showing the effect of curvature on the mode distribution within an optical waveguide in the case of a stepped index waveguide.
Figure 2:
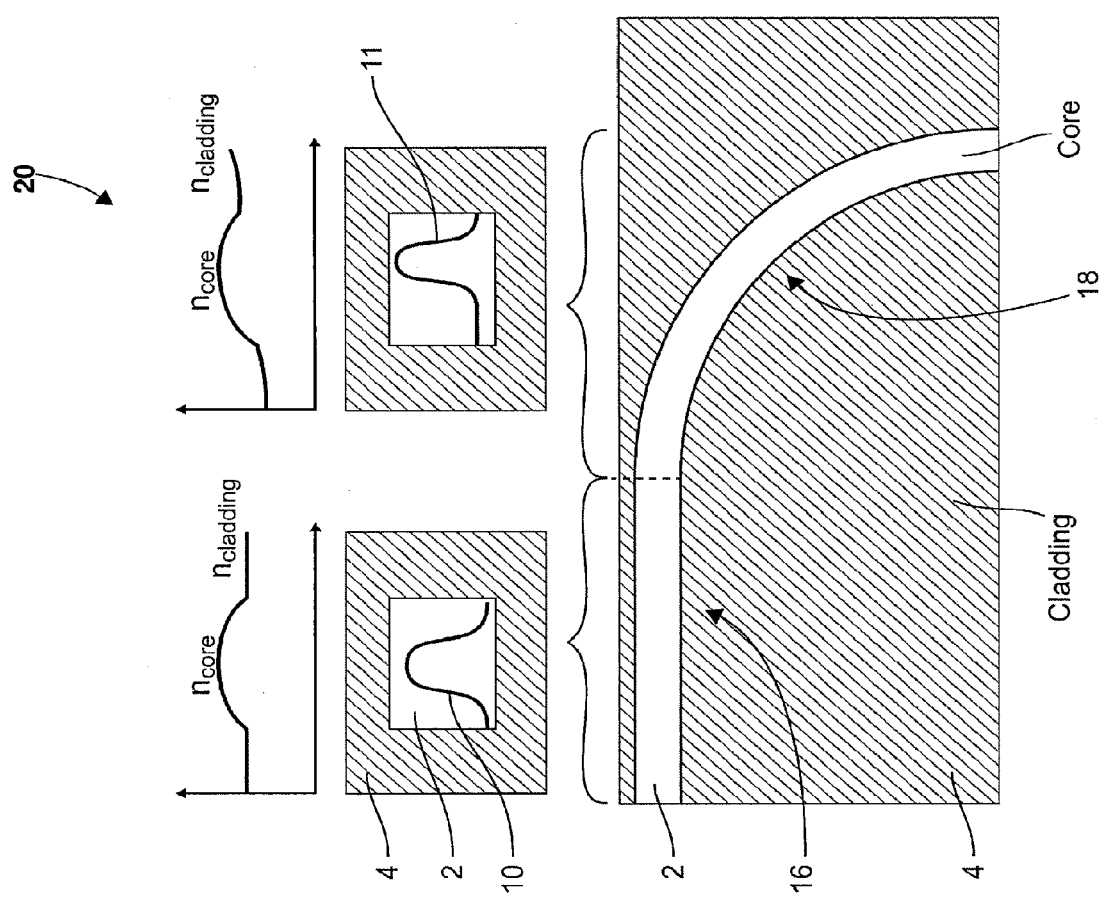
FIG. 2 is a schematic diagram of a waveguide showing the effect of curvature on the mode distribution within an optical waveguide in the case of a graded index waveguide.
Figure 3:
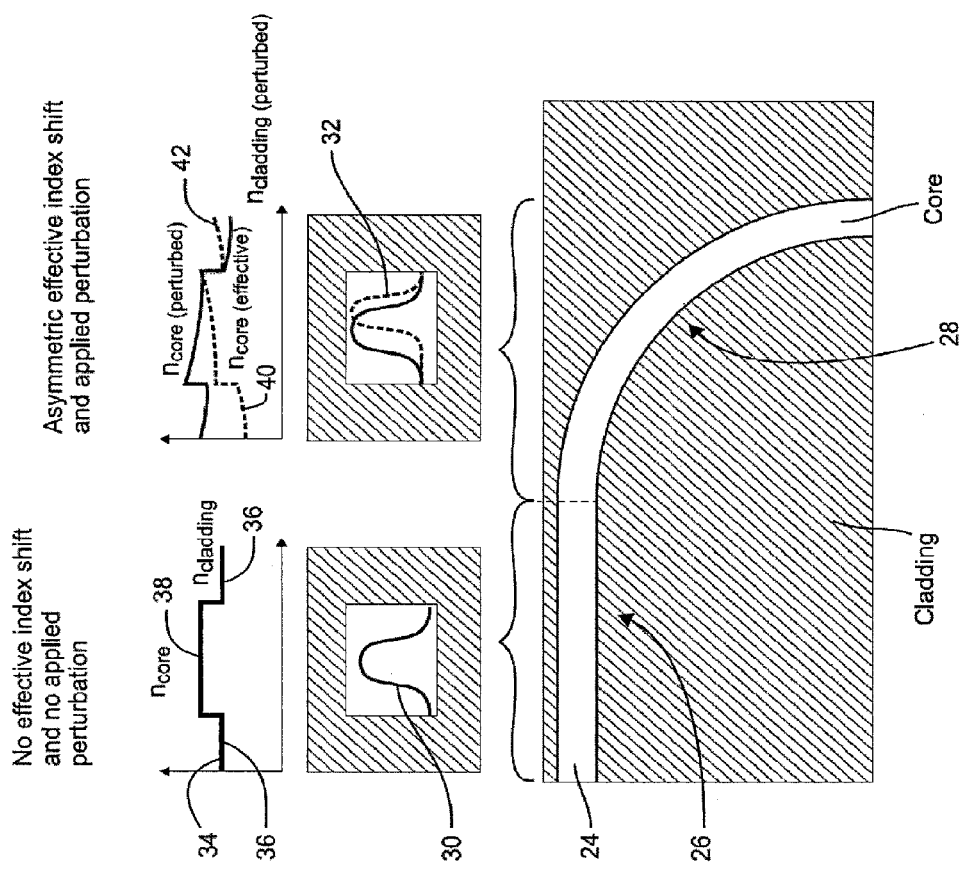
FIG. 3 is a schematic diagram of a waveguide showing the effect the mode distribution within a step-index optical waveguide with the application of an asymmetric index perturbation.
Figure 4:
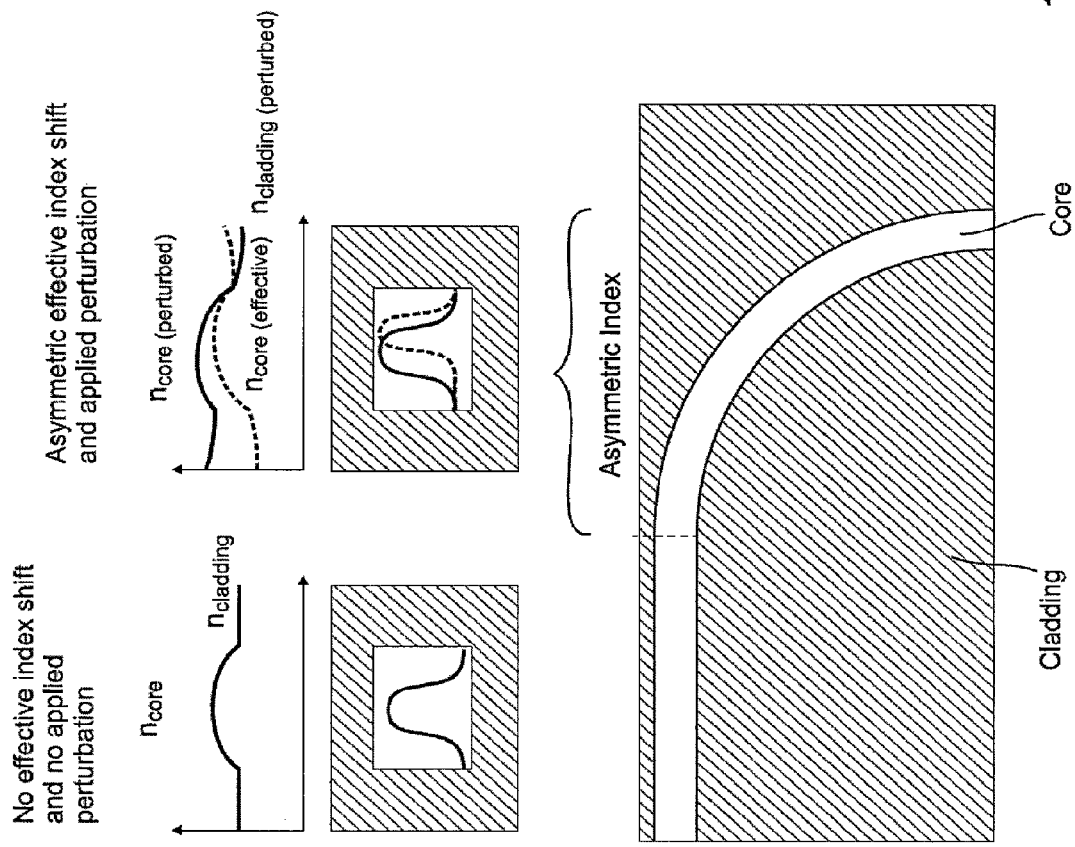
FIG. 4 is a schematic diagram of a waveguide showing the mode distribution within a graded-index optical waveguide with the application of an asymmetric index perturbation.
Figure 5:
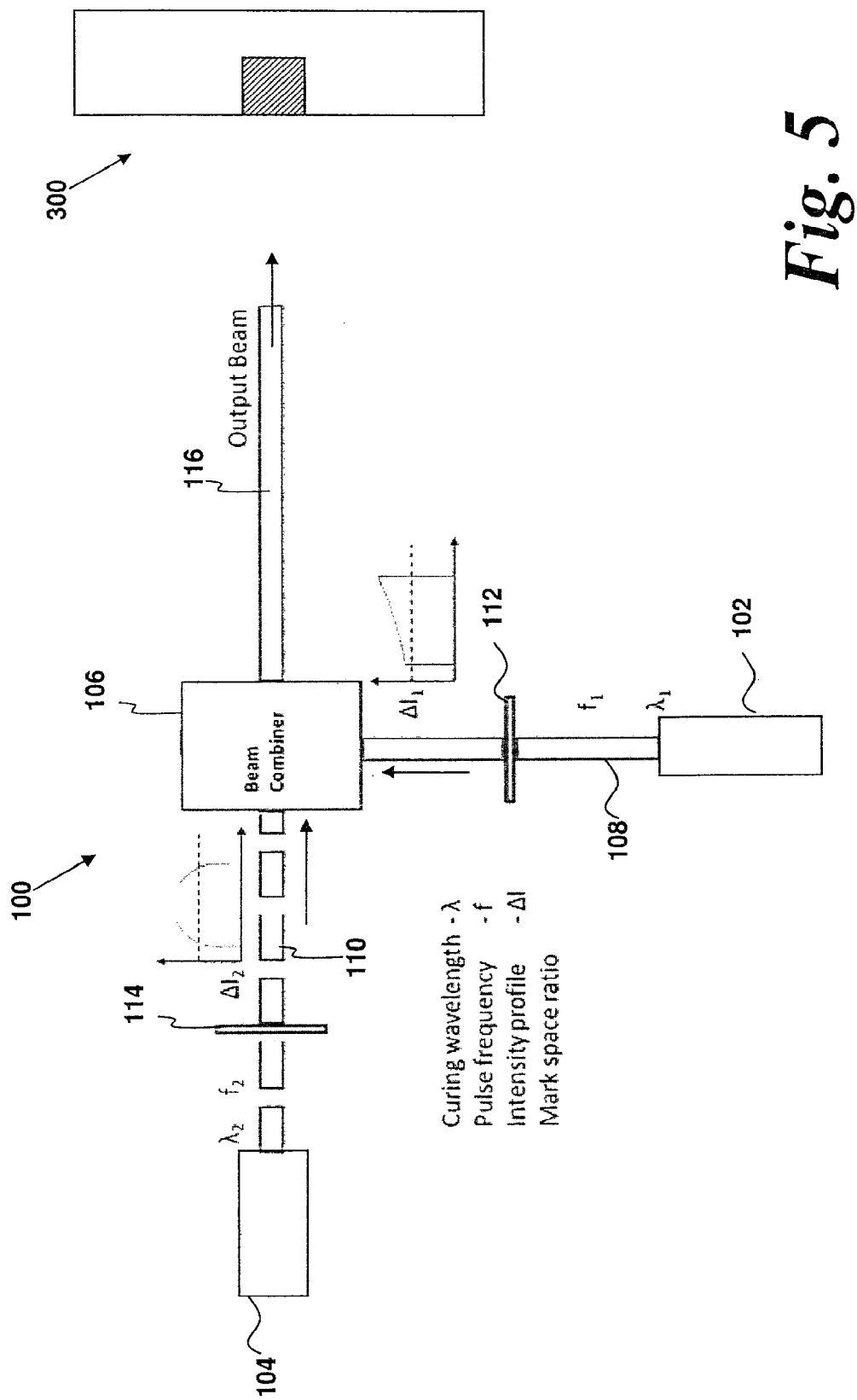
FIG. 5 is a schematic diagram of a beam shaping arrangement suitable for use within the embodiment of FIG. 3 or FIG. 4.

FIG. 5 shows a schematic illustration of a waveguide fabrication apparatus according to an embodiment of the present invention. The waveguide fabrication apparatus 100 comprises a first light source 102, a second light source 104 and a beam combiner 106 for combining the beam outputs from the first and second light sources 102, 104.

In this embodiment, the first and second light sources 102, 104 comprise light sources (typically laser, LEDs or lamps), which emit beams 108, 110 respectively of coherent (in the case of lasers) or incoherent (in the case of LEDs or lamps) radiation. The laser beams 108, 110 emitting at the wavelengths ($\lambda_1$ and $\lambda_2$) at which the corresponding components of an optical polymer mixture is to be cured is passed through a beam shaping arrangement 120. Appropriate beam shaping arrangements 120 are shown separately in FIGS. 6-9, but it is to be understood that, in practice, it may comprise either a part of light sources 102, 104 or be provided in the beam path therefrom. Preferably beam intensity profiling elements such as beam manipulators, as defined above, would be inserted into the separate optical beam paths prior to combination. In another embodiment the summed output beam may also be passed through a beam manipulator. In this embodiment source 104 produces a pulsed laser beam with a pulse frequency $f_2 \neq 0$ while source 102 is a continuous wave laser with a pulse frequency $f_1=0$. Pulsed lasers can produce much higher peak intensities than continuous lasers with the same average output power and therefore can induce stronger cross-linking or second order effects such as two-photon absorption.

In addition, if the laser source is pulsed, a specific pulse frequency and/or duty cycle (mark-space ratio) can be specified. A high duty cycle (e.g. greater than 50%) will result in a pulsed beam which is on for longer than it is off in a given frequency cycle. Alternatively, a low duty cycle enables a high peak intensity beam to be used without risk of photo- or thermal-degradation of the optical materials. This may be, as described above, particularly useful for inducing non-linear optical effects such as two-photon absorption.

The above examples illustrate laser sources. Many laser sources are applicable for use with the present invention. In general, optical polymers require UV or high-energy visible wavelengths in order to cure correctly. In this regard, a non-exhaustive list of suitable laser sources may comprise: Frequency tripled Nd:YAG (neodymium-doped yttrium aluminium garnet; $Nd:Y_3Al_5O_{12}$) at 355 nm; Frequency quadrupled Nd:YAG (neodymium-doped yttrium aluminium garnet; $Nd:Y_3Al_5O_{12}$) at 266 nm; Nitrogen ($N_2$) electrical discharge lasers at 337 nm; Argon (Ar) lasers frequency doubled to 244 nm and 257 nm; He—Cd (Helium Cadmium) lasers at 325 nm and 441 nm; Argon-ion lasers (of which the suitable wavelengths may be: 351.1 nm, 363.8 nm, 454.6 nm and 457.9 nm) and GaN (Gallium Nitride) diode lasers at 405 nm. Both pulsed and continuous wave (CW) sources may be used with the present invention as will be described later.

In addition, other types of light sources may be used with the present invention; for example, incoherent sources such as light emitting diodes (LEDs) or lamps (such as, for example, Halogen bulbs, Xenon arc lights or Mercury lamps) provided they have sufficiently collimated and intense beams. LED sources are available at 365 nm and 395 nm. Mercury lamps have strong lines at 313 nm, 366 nm and 404 nm. It is envisaged that, in the event that such alternative sources are used, the beams are sufficiently collimated to provide focussed input beams into the beam combiner 106.

In the beam shaping arrangement 120, the original beam is passed through a square or circular aperture 122, which has a diameter<<1/e diameter of the original Gaussian beam. This way only the very top "flat" portion of the Gaussian intensity profile is passed through, giving rise to a writing beam with a substantially uniform optical intensity profile across the width. This is important as curing is a function of intensity and a Gaussian curing beam would give rise to a bell shaped waveguide. The reason a circular aperture may be preferable to a square aperture is that when the beam is used to write bends, a circular aperture, being radially symmetric, would not require that the beam is rotated (i.e. the translation stage holding either the laser head or the substrate to be cured) to track the waveguide curvature. This would typically be required for a square aperture. The beam is then passed through lenses 124, 126 to collimate, reimage, distort or change the magnification of the beam for transmission to other parts of the waveguide fabrication apparatus 100.

The laser beams 108, 110 are arranged to be inputted into the beam combiner 106 through appropriate input apertures (not shown). The beam combiner 106 is then operable to combine the beams 108, 110 to form a single output beam 116. The operation of the beam combiner 106 to form the output beam 116 will be described later with reference to FIGS. 12 and 13.

The beams 108, 110 are, optionally, passed through beam intensity profilers 112, 114 as shown in FIG. 5. The beam intensity profilers 112, 114 (or beam manipulators) apply a transverse intensity profile $\Delta I_1$, $\Delta I_2$ to each beam 108, 110 respectively as desired by the user. The beam intensity profilers 112, 114 may be placed at any suitable point in the optical system. FIGS. 7 to 9 show alternative locations of the beam intensity profilers 112, 114 in the beam shaping arrangement 120 of each light source 102, 104.

In FIG. 7, the beam intensity profiler 112, 114 is placed before the aperture 122. In FIG. 8, the beam intensity profiler 112, 114 is placed after the aperture 122. In FIG. 9, the beam intensity profiler 112, 114 is placed after the lens 126 and/or after the beam shaping arrangement 120. Each of the above examples could be applied to one or more of the light sources 102, 104 as required to achieve a particular intensity or spatial profile of the resulting beam to be inputted to the beam combiner 106.

The transverse intensity profile $\Delta I_1$, $\Delta I_2$ of each beam 108, 110 is achieved by use of appropriate beam manipulators (such as neutral density filters or electro-optic filters) located in the beam intensity profilers 112, 114. The neutral density filters may be passive (fixed transmissivity profile) or active (user programmable transmissivity profile).

Figure 10:
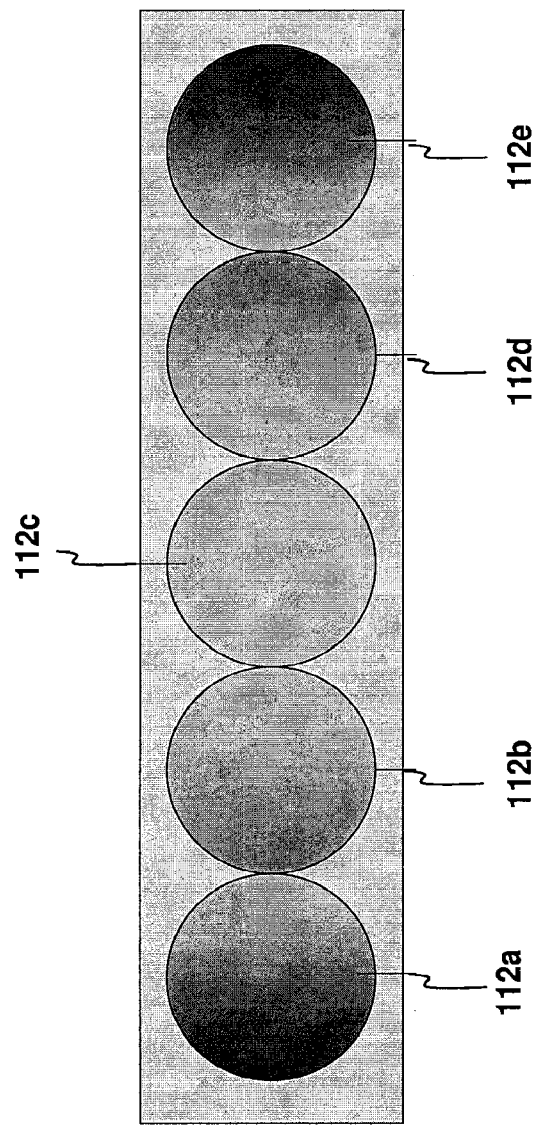
FIG. 10 is a schematic diagram of a passive beam intensity profiler suitable for use with the present embodiments in the form of an array of neutral density filters, which can be selectively positioned into the beam path in order to provide a given output intensity profile for a given section of the waveguide.

Passive neutral density filters can be manually selected for simple waveguide profiles. An example of this is shown in FIG. 10 in which a beam intensity profiler comprises a panel of five mechanically switchable intensity filters 112 a-e with specifically selected transmissivity profiles. The passive neutral density filters 112a-e may comprise any suitable type of filter. For example, graded intensity filters (where the transmissivity is asymmetrically reduced from one region to another giving rise to a matching asymmetric intensity gradient of light passing through it); or "flat" neutral density filters. Additionally, whilst five filters are shown in FIG. 10, the skilled person would readily understand that any suitable configuration, geometric arrangement or number of filters could be used.

Alternatively, the neutral density filters may comprise programmable dynamic intensity neutral density filters. Such "active" filters, which typically will contain an electro-optic filter element, could be actively programmed or dynamically configured electronically on the fly to any arbitrary transmissivity profile as required during writing of an arbitrary waveguide. This could be achieved, for example, through use of a high resolution liquid crystal-based filter or other programmable neutral density filters or adaptive optics. This approach enables a continuously-variable range of unique intensity distributions to be provided. In addition, dynamic filters alleviate the latencies inherent to mechanically changing filters; in other words, changing the filter switching mechanism from that of mechanical switching to that of electronic reconfiguration will enable fast switching of the curing beam to provide rapid processing of an optical waveguide on a substrate.

As a further alternative, the beam intensity profilers 112, 114 may comprise adaptive beam shaping technology. This may involve a lens which can dynamically change its shape or internal refractive index profile (in the case of a GRIN lens for example) according to user requirements through say electronic or thermal stimulus.

Three Beam Combiner

Figure 11:
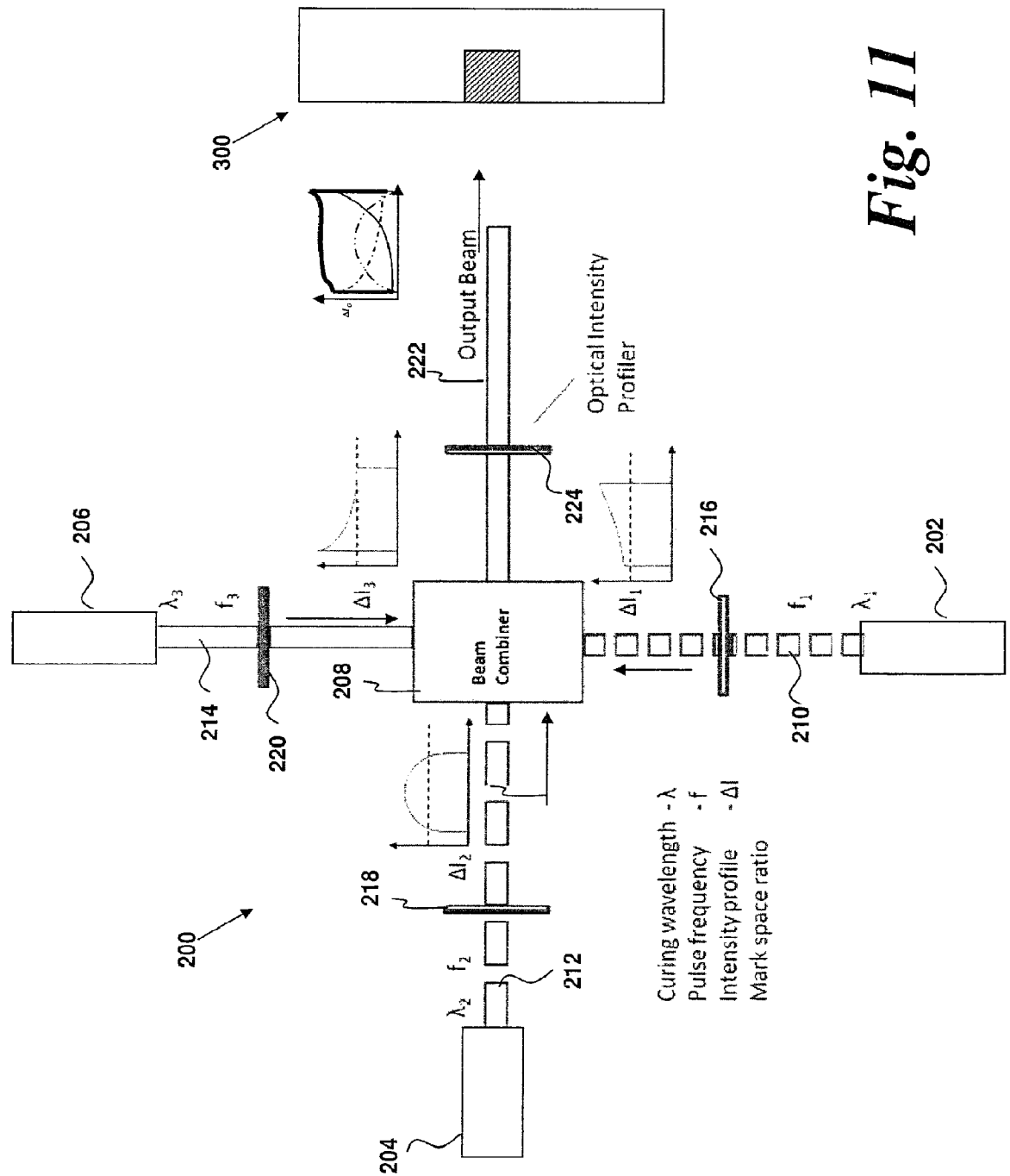
FIG. 11 is a schematic diagram of a waveguide fabrication apparatus according to another embodiment of the present invention.

FIG. 11 shows a schematic illustration of a waveguide fabrication apparatus according to an alternative embodiment of the present invention. The waveguide fabrication apparatus 200 comprises a first light source 202, a second light source 204, a third light source 206 and a beam combiner 208 for combining the outputs from the first, second and third light sources 202, 204, 206.

In this embodiment, the first, second and third light sources 202, 204, 206 comprise light sources (typically containing lasers, LEDs or lamps), which emit beams 210, 212, 214 respectively of coherent (in the case of lasers) or incoherent radiation (in the case of LEDs or lamps). A list of suitable laser sources was described with reference to the embodiment of FIG. 5 and those sources are equally suitable for use in this arrangement.

The beams are collimated, reimaged, magnified or otherwise distorted) by appropriate optics (such as the beam shaping arrangement 120 shown in FIGS. 6-9) and may, optionally, be passed through beam intensity profilers 216, 218, 220 as shown in FIG. 11. The beam intensity profilers 216, 218, 220 (or beam shapers) apply a transverse intensity profile $\Delta I_1$, $\Delta I_2$, $\Delta I_3$ to each beam 210, 212, 214 respectively as desired by the user. The transverse intensity profile $\Delta I_1$, $\Delta I_2$, $\Delta I_3$ of each beam 210, 212, 214 is achieved by use of appropriate neutral density filters or electro-optic filters located in the beam intensity profilers 216, 218, 220. The beam intensity profilers 216, 218, 220 may take the form of any of the arrangements described with reference to FIGS. 7 to 10 of the previous embodiment.

However, as for the embodiment of FIG. 5, other types of light sources may be used with the present invention; for example, incoherent sources such as light emitting diodes or lamps. It is envisaged that, in the event that such sources are used, the beams are collimated to provide focussed input beams into the beam combiner 208.

The beams 210, 212, 214 are arranged to be inputted into the beam combiner 208 through appropriate input apertures (not shown). The beam combiner 208 is then operable to combine the beams 210, 212, 214 to form a single output beam 222. The operation of the beam combiner 208 to form the output beam 222 will be described later with reference to FIGS. 12 and 13.

Optionally, an optical intensity profiler 224 may be provided on the output beam 222 to provide further beam intensity profiling. The optical intensity profiler 224 may be similar to any of the beam intensity profilers 114, 116, 216, 218, 220 as described previously and is used to provide further shaping and or finessing of the output curing beam 222.

The beam combiners 106, 208 may comprise any suitable form of apparatus which is operable to combine two or more beams of electromagnetic radiation. Two alternative exemplary beam combiners are illustrated in FIGS. 12 and 13.

FIG. 12 shows a schematic example of an incoherent beam combiner 150 suitable for use as the beam combiner 106 or 208 of the present invention. FIG. 13 shows a spectral beam combiner 180 suitable for use as either of the beam combiners 106, 208 of the present invention.

Referring firstly to FIG. 12, the beam combiner 150 comprises first, second and third inputs 152, 154, 156. Each input 152, 154, 156 is operable to receive an input beam 158, 160, 162 as described in the first and second embodiments above. Whilst three input beams are shown and described, it is envisaged that there may only be two input beams (as for the first embodiment above) or more than three input beams if desired.

The beam combiner 150 further comprises first and second beam combination elements 164, 166. The beam combination elements 164, 166 may take a number of forms; for example, polarisation filters, edge filters, cold mirrors or half-silvered mirrors. Whatever form is chosen, the beam combination elements 164, 166 are required to transmit and/or reflect the appropriate beams such that they can be combined into a single beam.

Consider, for example, the use of edge filters which have a specific transmission wavelength band or bands. In the case of beam combination element 164, the edge reflector would be chosen to transmit the input beam 158 but reflect beam 160. In the case of beam combination element 166, the edge filter would be chosen to transmit beams 158, 160 but reflect beam 162.

An output aperture 168 is provided which is operable to transmit an output beam 170. The output beam 170 comprises a direct superposition of the input beams 158, 160 and 162. The output beam 170 may then be subject to further spectral or spatial filtering or processing prior to being utilised to expose a waveguide sample.

FIG. 13 shows an alternative configuration of beam combiner in the form of a spectral beam combiner 180. In the beam combiner 180, input beams 158, 160, 162 are inputted and passed sequentially through a cylindrical lens 182 and a transfer lens 184. The refracted light is then incident on a wavelength-dependent element 186. The element 186 may comprise any suitable arrangement; suitable elements may be a prism, a diffraction grating, a dichroic mirror or a Bragg grating. The element 186 is operable to reflect light of different wavelengths at different angles. This property is used to superpose the beams to form a single coherent output beam 188.

The output beam 188 will have a transverse intensity profile and a combined wavelength profile corresponding to a superposition of the input beams 158, 160, 162 as will be described later.

Wavelength and Intensity Selection

Figure 14:
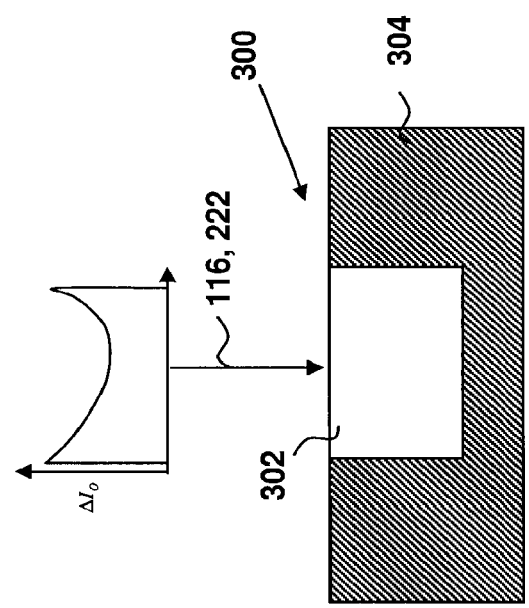
FIG. 14 is a schematic diagram of a waveguide and intensity profile of an output curing beam of the present invention.

FIG. 14 shows an example of a waveguide 300 to be formed by the method of the present invention. The waveguide 300 comprises a precursor waveguide core 302 surrounded by cladding 304. The precursor waveguide core 302 comprises a mixture of one or more optical polymers and one or more photoinitiator compounds as will be described later. When the mixture of the precursor waveguide core 302 is exposed to the output beam 116, 222, the photoinitator compound is photoexcited and thus catalyses crosslinking in the optical polymer or polymers within the mixture.

In order for curing to occur, the curing radiation must be at or above a certain intensity level (hereon referred to as a curing threshold) to cure completely and harden (i.e. to make impervious to developing process) all of the polymer it reaches giving rise to a rectangular upper profile. Any light below this curing threshold will not completely cure the polymer exposed to it and will result in an incompletely formed upper surface typically rounded in some way. In order to ensure a completely formed upper surface and refractive index profile, all parts of the required summed intensity profile must be above the curing threshold. In other words, the curing threshold is the level of curing light at which the whole core becomes hard or otherwise impervious to the etching methods deployed to remove uncured material. It is not strictly necessary for all parts of the intensity profiles of each individual beam (prior to combination) to be above the curing threshold as long as the combined intensity profile i.e. the sum of the individual intensity profiles, is sufficient to fully cure the waveguide.

The method and apparatus of the present invention, in which a beam combiner is used to provide a summed output beam, which includes a superposition of two or more input beams, is operable to vary the intensity profile, wavelength composition and pulse energy across the transverse direction of the curing beam. This enables selective curing of the optical polymer or polymers within the waveguide core 302 to effect production of a desired arbitrary refractive index profile. It is to be noted that, whilst the examples described herein relate to fabrication of arbitrary transverse refractive index profiles, it is also possible to produce arbitrary longitudinally-varying refractive index profiles, i.e. refractive index profiles which vary along the waveguide axis. The latter is achieved by dynamically controlling the parameters of the individual curing beams (prior to combination) and/or the summed output beam during relative translation of the laser writing stage with respect to the substrate as the waveguide is written.

In use, the output curing beam 116, 222 is incident on the waveguide core 302 in order to cure the waveguide core 302. The output curing beam 116, 222 has a transverse intensity profile $\Delta I_O$ as shown in FIG. 15.

Figure 15:
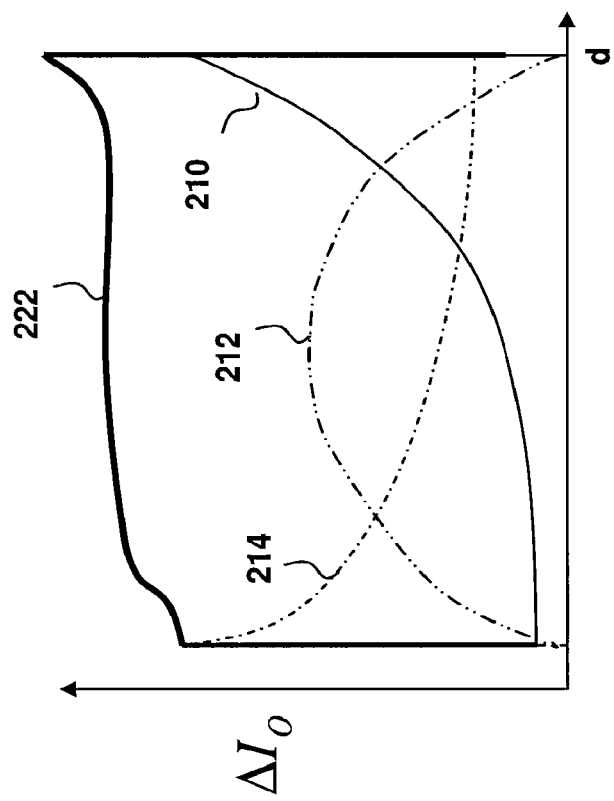
FIG. 15 is a graph showing the transverse intensity and wavelength profile of the output curing beam of an embodiment of the present invention.

FIG. 15 shows the intensity profile of output beam 222 (schematically illustrated in FIGS. 11 and 14). Output beam 222 comprises a superposition of input beams 210, 212, 214 as shown in FIG. 11. Input beam 210 has a wavelength $\lambda_1$, a transverse intensity profile $\Delta I_1$ and a pulse frequency $f_1$. Input beam 212 has a wavelength $\lambda_2$, a transverse intensity profile $\Delta I_2$ and a pulse frequency $f_2$. Input beam 214 has a wavelength $\lambda_3$, a transverse intensity profile $\Delta I_3$ and a pulse frequency $f_3$. The resulting output beam 222 has a transverse total radiation intensity profile $I_O$ corresponding to the sum of $\Delta I_1$, $\Delta I_2$ and $\Delta I_3$. This is shown as the thick black line in FIG. 15.

However, the line shown in FIG. 15 is the intensity profile of the number of photons incident on a particular section of the waveguide core 302, irrespective of the wavelength of the photons. This would be the total intensity distribution of the radiation of a particular wavelength if, for example, input beams 210, 212 and 214 were of the same wavelength.

It is, however, possible that at least some of $\lambda_1$, $\lambda_2$ and $\lambda_3$ are selected to be different. For example, if $\lambda_1$ and $\lambda_3$ are the same (for example, continuous wave laser excitation at 355 nm), but $\lambda_2$ is different (for example, continuous wave laser excitation at 250 nm), then the central section of the intensity profile will have a higher flux of curing radiation at 250 nm than the edges thereof. Since 250 nm may be used to "deep cure" certain optical polymers, in this configuration, the central portion of the waveguide core 302 may be cured to a greater extent than the edge portions, leading to a stronger variation in refractive index across the core 302 than could be achieved by simply curing with one beam.

It is also possible that each of the input beams 210, 212, 214 has a different wavelength $\lambda_1$, $\lambda_2$, $\lambda_3$. In this configuration, particular wavelengths and intensity profiles can be selected to achieve particular desired properties as will be described.

In addition to the selection of wavelength and intensity profile for each of the input beams 210, 212, 214 it is also possible to control other parameters of the input beams 210, 212, 214. For example, in the case of a laser excitation source, it is possible to select between continuous wave (CW) and pulsed laser sources.

CW laser sources generate beams which have a substantially constant output power profile with time (once stabilised after start-up). However, a pulsed beam may also be used which may provide a similar average power density per unit time to a CW laser source, but which will have much higher peak intensities. A pulsed laser source may be useful in situations where a high peak intensity level is desired. For example, consider the situation where it is desired to penetrate deep into the layer to be cured where the material has a high absorption at the lasing wavelength. A pulsed beam may not induce photo-degradation of the polymer layer as readily as a high intensity CW radiation. In addition, the higher optical intensities can be used to stimulate non-linear absorption mechanisms such as 2-photon absorption.

The intensity, beam shape and mark-space ratio of a pulsed laser beam can also be utilised in conjunction with that of the other laser beam or beams to achieve a desired spatial and/or temporal intensity profile of the summed curing output beam 222.

In summary, by use of a beam combiner as set out in the present invention, regions of the curing beam can have a selected chromaticity profile to achieve different curing profiles. For example, if it is desired to cure a central portion of a waveguide core 302 more deeply than an edge portion thereof, it is possible to expose the central portion to a longer wavelength of light (for example, a wavelength in excess of 400 nm) than the edge portions. Since the longer wavelength radiation has a greater penetration depth through the mixture to be cured, a more complete cure can be expected. In contrast, exposure of the edge portions to a lower wavelength of light (for example, 325 nm) would enable a reduced level of cure and a different refractive index to be achieved in these regions.

One important benefit of the use of multiple curing beam types therefore is that different curing beams will solicit different curing profiles. For example while some curing beams (e.g. with longer wavelengths) will cure at greater penetration depths and others (shorter wavelength continuous wave) will provide only superficial and weak surface curing, some (e.g. pulsed with high peak intensities) will induce localised second order absorption curing effects (two-photon absorption). In addition, through the use of beam combining it is possible to focus different beams at different points within the core to be cured. For example, two-photon absorption occurs at points of particularly high radiation intensity and so this could be encouraged to occur at different regions of the core by means of different focal points, both transversely and depth-wise through the core to be cured. In other words, whilst the above description has referred to collimated beams, it is within the scope of the present invention to provide a summed output beam comprising input beams having different focal points to achieve specific curing effects.

In summary, by combining different beams with very different curing properties one can simultaneously create an arbitrary transverse refractive index profile (within the limits of possible refractive index variability) both across the waveguide width and height.

Polymer Selection

Optical polymers have refractive indices which vary considerably depending upon their chemical and morphological structure. A wide variety of different polymers are available and so the optical properties can be selected as desired by selecting the appropriate polymer.

Table 1 below outlines a number of optical polymers, together with their refractive indices, suitable patterning techniques and suppliers (for reference purposes). It is to be noted that, whilst the present invention is particularly applicable to photolithographically patterned and cured polymers, these polymers may also be used with other types of polymer (for example, thermal cure) to achieve particular refractive index or structural properties as will be described later.

TABLE 1

| Polymer Type | Refractive Index $n_{1(core)}$, $n_{2\ (cladding)}$, NA (numerical aperture) | Patterning Technique | Suppliers, $T_g$ ° C. CTE,/° C. |
|---|---|---|---|
| Acrylate, GuideLink ® [multiple constituent monomer and polymer formulations] (formerly Polyguide ®) | 1.53 core, 1.5 clad NA <0.1 SM to 0.32 MM ($\Delta n$ = 0.003 SM to 0.035 MM) | Photolith defined; photo induced diffusion self dev.; Multi layer self supporting film sheets 12 × 12 inch+ | Optical InterLinks (previously DuPont and Optical CrossLinks) |
| Truemode ® wet film | 1.5563, 1.5266, NA 0.3 $\Delta n$ = 0.0297, 1.9% | Photolith., laser ablation | Exxelis, |
| Polymethyl-methacrylate, PMMA | 1.47 @ 800 nm or 1.49 | Upper cladding | Multiple suppliers $T_g$ = 100° C., $T_g$ = 105° C. |
| Acrylate fast curing formulation | $\Delta n$ = 1.9% | UV direct write | Multiple suppliers $T_g$ = 250° C. |
| Acrylates, 80% Fluorinated Acrylates | 1.30-1.60 | Photolith. Laser direct write | Allied Signal |
| Halogenated Acrylate, OASIC ® | No change @ 1550 nm after 6000 hrs at 225° C. | Photolith., wet etch, RIE, laser ablation | DuPont formerly Telephotonics |
| Polysiloxane, Light Link ® | 1.49-1.515 | Photolith. | Rohm and Haas |
| Polysiloxane, SLM77522 | 1.43 | Mould, Heat cure | Wacker Chemie |
| Polydimethyl-siloxane, PDMS, RT601 | 1.41 | Mould, Heat cure | Wacker Chemie, Stable >290° C. |
| Deuterated Polysiloxane | 1.5365 @ 1.3 µm 1.5345 @ 1.55 µm | RIE, Photolith. | NTT, stable |
| Ormocer ® ORganic MOdified CERamic inorganic-organic copolymer, sol-gel silicate based | 1.5475 @ 830 nm, 1.5306 @ 830 nm, 1.553, 1.534, 0.2 | Photolith., moulding, laser ablation | Micro Resist Tech. |
| Fluorinated polyether, ZP2145M | 1.4913, 1.4840 | Hot em-bossing, thermal cure | Zen Photonics |
| Tetrafluoro-ethylene | 1.31 (AF 1600) | | DuPont |
| Perfluoro-vinyl ether copolymer, Teflon ® AF, tetra-fluorovinyl, polytetrafluoro-ethylene | 1.29 (AF 2400), 1.38-1.53 | RIE, photo-lith, ebeam lith, nano-emboss | DuPont |
| Perfluorovinyl Ether Cyclopolymer, CYTOP ® | 1.34, 1.354 @ 830 nm, 1.35 @ 1550 nm, Hydrophobic | RIE, photolith | Asahi Glass, $T_g$= 108° C., no C—H bond |

TABLE 1-continued

| Polymer Type | Refractive Index $n_{1(core)}$, $n_{2\ (cladding)}$, NA (numerical aperture) | Patterning Technique | Suppliers, $T_g$ ° C. CTE,/° C. |
|---|---|---|---|
| Cyclo-olefin copolymer, COC with poly-norbornene, TOPAS ® Thermoplastic Olefin-Polymer of Amorphous Structure | 1.5259@ 830 nm, 1.5217@ 1550 nm | RIE, hot embossing | Ticona Low birefringence under stress |
| Benzo-cyclobutene, BCB, Cyclotene ® | 1.57 @ 633 nm, 1.56 @ 1550 nm | RIE, photolith. | Dow Chemical, $T_g$ = >350° C. |
| Polycarbonate | 1.58 | | $T_g$ = 145° C. |
| Epoxy Resin | 1.58 | | |
| SU-8 photoresist hard baked | 1.64 @ 633 nm | Photolith, Reflow. | Shipley |
| Epoxy, OG169, 146 | 1.52-1.54 @ 632.8 nm | UV cure, moulding | Epoxy Tech. |
| NANO ® SU-8-25 with developer propylene glycol monomethyl ether acetate, PGMEA, RER 600. | 1.58 @ 800 nm | Photo-lith. | Micro-chem |
| MR-L6100XP refractive index modified SU-8/15 wt % | 1.573 @ 830 nm | Clad for SU-8-50 | Micro-resist Tech. $CTE_{L6100}$ = 50 × 10$^{-6}$/° C. |
| Lensbond ® + 9-vinyl-carbazole (98%). | 1.52-1.6 tunable | Upper clad for SU-8 | Lensbond |
| Polystyrene | 1.59 | | $T_g$ = 100° C. |
| Polyurethane | 1.56 | | Multiple suppliers |
| Poly-(phenyl-silsesquiozane) PPSQ | 1.535 @ 632.8 nm, 1.522 @ 850 nm, 1.515 @ 1.3 µm | | Multiple suppliers |
| Mercapto-ester with acrylates, Norland ® optical adhesive, NOA | 1.56589 | UV cure | Multiple suppliers |

A blend of polymers could also be used to form an optical waveguide. In general, blending and copolymerizing selected miscible monomers can facilitate precise tailoring of the refractive index of the polymer blend. The refractive index of the blend is, absent of external factors, related to the proportion of the component polymers in the blend. In general, the resultant refractive index of a blend will lie in a region between the refractive indices of the component polymers.

Degree of Polymer Cure

Many optical polymers have a refractive index, which varies in dependence upon the degree of cross-linking during the polymerization process. The degree of crosslinking is, in turn, dependent upon the photopolymerization initiator. This dependence includes the initiator to polymer ratio, the degree of photoexcitation or photolysis of the initiator, the intensity and excitation wavelength of the radiation to which the initiator is exposed, the absorption spectrum of the optical polymer with respect to the excitation wavelength and the absorption spectrum of the photoinitiator. In general, the polymerization process will stop when either:

1. The light source is removed so that no more photo-generated radicals are produced.
2. All the monomer/oligomer is consumed.
3. There is severe radical quenching by oxygen.
4. Chain termination occurs In practice, it is rare for all of the monomer/oligomer to be converted to polymer. To an extent, cured cross-linked polymer will "lock in" unreacted monomer, oligomer or initiator and prevent further reaction. In other words, as the polymer cross-links and gels, the mobility of the reactants is reduced, making the opportunities for further reaction between the radicals and the remaining monomer or oligomer less likely. Therefore, a cured material may contain a substantial amount of residual monomer or oligomer. This property of the curing can be exploited to tune further different properties of the cured material. Therefore, in summary, it possible to selectively control the refractive index of an optical polymer by controlling the degree of curing of the polymer.

The degree of polymer cure can also be tuned by the relative proportion of photoinitiator in the resin mixture. High levels of photoinitiator will, in general, generate many catalysing radicals. This will have the general effect of producing numerous polymer chains with low molecular weights as the cure goes to completion. Polymers cured in this manner generally have a broad molecular weight distribution and a correspondingly softer film structure. In addition, due to the increased absorption by the photoinitiator, the cure will often be relatively shallow and the speed of the cure will be relatively higher.

Concomitantly, low concentrations of photoinitiator will, when photoexcited, produce a lower radical count that leads to fewer, high-molecular-weight polymer species being produced. Such polymers are often harder and have a better defined molecular weight. Generally, concentrations of initiator from around 3-4 wt % up to 6-7 wt % are suitable for most applications, with curing performance decreasing at concentrations above this level.

The refractive index may also vary depending upon the resulting morphology of the polymer structure. This approach could be used to tune the refractive index.

Blends of polymers can also be used where one component of the blend is cured more than the other to express more the properties of the more highly cured polymer. The degree of curing of a particular polymer with respect to another in a mixture could be used to control precisely the refractive index of the blend. Polymer blends are particularly useful in the context of the present invention. In general, blending and copolymerizing selected miscible monomers can facilitate precise tailoring of the refractive index of the polymer blend. Crucially, by applying a localised variation in intensity of different curing beam types one can control the localised refractive index across the waveguide width and height, thus enabling complex refractive index profiles including graded index or asymmetric index profiles to be fabricated in a well defined and reproducible manner.

Initiator Selection

As described above, curing of optical polymers requires a mixture of a monomer and/or oligomer (which are to be cross-linked to form the cured optical polymer) together with a photopolymerization initiator. Photopolymerization initiators are configured to decompose upon exposure to appropriate radiation (photolysis) and release components (for example, radical ions) which promote cross-linking to form the optical polymer.

Figure 16:
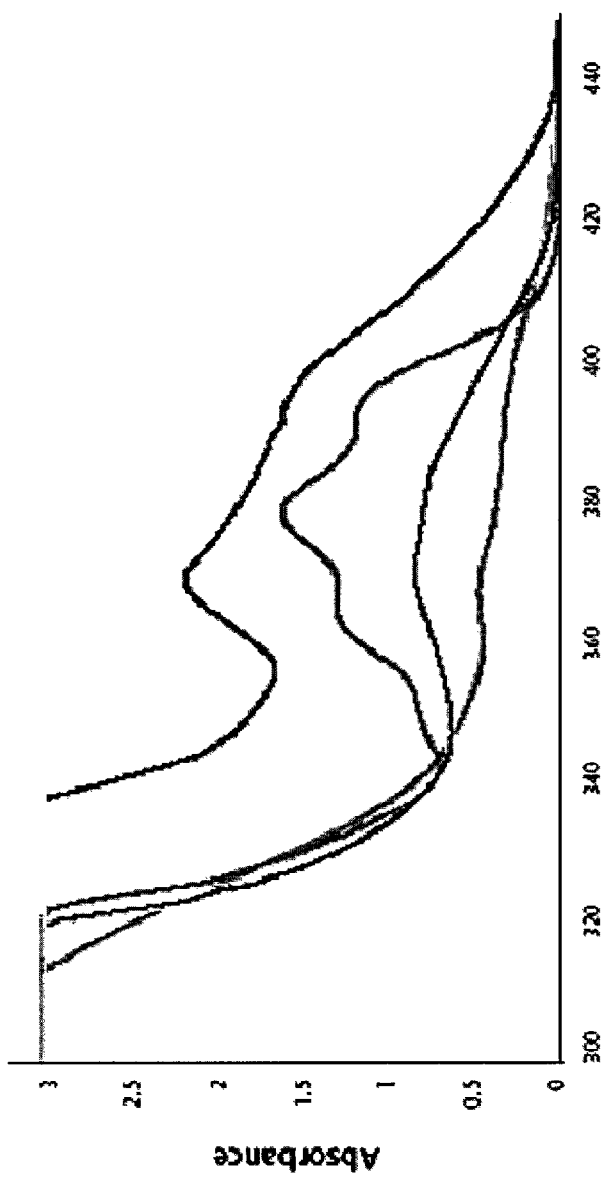
FIG. 16 is a graph showing the absorption spectra of various photopolymerization initiator compounds.

Photopolymerization initiators have specific absorption bands. These bands can be tuned by chemical structure to absorb at selected wavelengths. FIG. 16 shows examples of the absorption spectra of some known photopolymerization initiators (taken from "Breakthrough Innovations in UV/Visible Light Curing Materials and Systems" presentation by Ellsworth Adhesives).

What can be seen from this figure is that common photopolymerization initiators have strong absorption below about 340 nm with lower energy absorption bands in the region of 360-440 nm, the magnitude of which is dependent upon the particular material under consideration.

Therefore, in general, photoexcitation at shorter wavelengths will result in greater absorption by the photoinitiator and, as a result, a greater number of photo-generated radicals. This will also lead to a reduced penetration depth. Concomitantly, excitation at wavelengths beyond 400 nm will lead to reduced absorption of photons and a greater penetration depth. Consequently, it is possible to photoexcite the initiators at a range of different wavelengths to achieve different levels of cure and different penetration depths.

A further factor which will influence the degree of curing is the absorption of the monomers, oligomers and resulting cross-linked polymers of curing radiation. Most monomers, oligomers and polymers absorb strongly at wavelengths below about 300 nm. Clearly, absorption of incident curing light by the monomers, oligomers or polymers will reduce the available incident radiation for absorption by the photopolymerization initiator compounds. Therefore, selective curing can be achieved by use of longer wave radiation, which is outside the absorption band of most monomers, oligomers and polymers (for example, radiation around 400-440 nm) but within the range of the initiator compounds.

Figure 17:
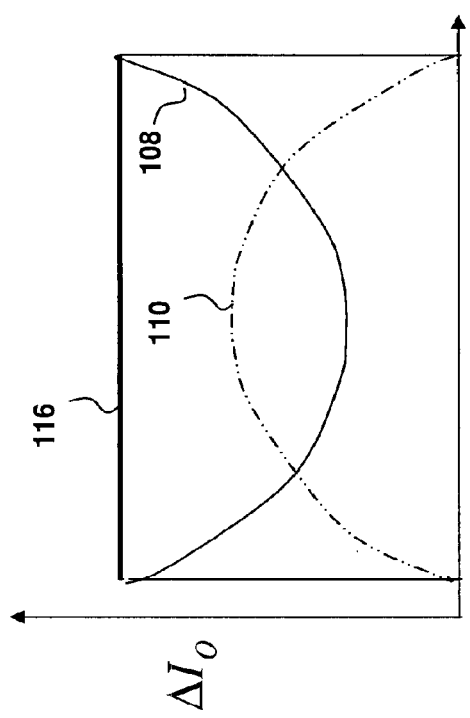
FIG. 17 is a graph showing the transverse intensity and wavelength profile of the output curing beam of an embodiment of the present invention.

Consider now the plot of intensity as a function of transverse beam profile as shown in FIG. 17. In this arrangement, for simplicity, the curing beam 116 comprises only two combined beams 108, 110 and so corresponds to the arrangement as shown in FIG. 5. The beam 108 comprises a laser excitation by a CW He:Cd laser source at 325 nm. Beam 110 comprises laser excitation by a CW GaN laser source at 405 nm. It is assumed that the peak intensity of each of the beams 108, 110 is selected to be substantially the same so that the peak intensity of the output beam 116 is constant in the transverse direction.

As shown, a transverse profile is applied to the beams 108, 110 so that there is proportionally more radiation at 405 nm in the central portion of the output beam 116 than at the edges. There is, correspondingly, a proportionally greater amount of radiation at 325 nm towards the edges of the beam 116.

Consider now the absorption spectra of the photoinitiators shown in FIG. 16. Taking the photoinitiator with the largest absorption at longer wavelengths, it can be seen that the absorption is greater at 325 nm than at 405 nm. Therefore, it could be expected that light at 405 nm will have a greater penetration depth with regard to the initiator than at 325 nm. In addition, when forming part of a curable resin (i.e. in combination with monomers and oligomers), the absorption of the other components of the resin must be taken into account. Monomers, oligomers and polymers may comprise absorption bands which extend up to 325 nm but are unlikely to extend to 405 nm unless dyes or pigments are used.

Therefore, overall, it is to be expected that the radiation at 405 nm will have a greater penetration depth into the material of the waveguide 300 than the radiation at 325 nm, although less of that radiation will be absorbed by the initiator. These factors, when combined, may lead to greater photoexcitation of the initiator in the deeper regions of the waveguide core 302 where most exposure radiation is at 405 nm (i.e. at the centre of the waveguide in the transverse direction).

The area exposed to predominantly 405 nm radiation (i.e. the central portion) will, therefore, have a more evenly distributed, but lower, proportion of radical generation through the depth of the material than at the edges. This may lead to different curing of the photopolymer in this region; for example, production of a higher molecular weight optical polymer with a greater hardness than at the edges thereof. Thereby, using two light sources at different wavelengths but only one polymer and photoinitiator, a graded index waveguide may be formed using the different curing properties of the combined output curing beam.

Multiple Initiators

Furthermore, it is possible to select particular photoinitiators to match particular polymers. This is particularly useful in the context of polymer and photoinitiator blends because each photoinitiator can be selected to photopolymerize only one polymer in the blend. In other words, the photoinitiators can selectively polymerize different polymer components in a polymer blend depending upon which is excited.

Consider again the output beam pattern shown in FIG. 17. Now, the curing resin comprises two polymers of different refractive index when cured. Each polymer has a specific photoinitiator associated therewith so that photoactivation of only that initiator will result in cross-linking of its associated polymer in the polymer blend. This may be achieved by selection of the photoinitiators such that the generated radicals from photoexcitation of one photoinitiator only promote cross-linking of one polymer and the generated radicals from photoexcitation of the other photoinitiator only promotes cross-linking of the other polymer.

Figure 18:
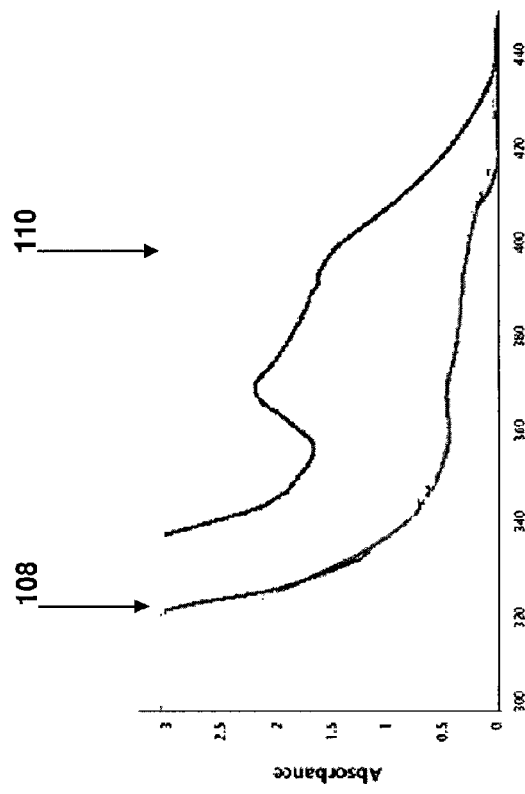
FIG. 18 is a graph similar to FIG. 16 showing the absorption spectra of selected photopolymerization initiator compounds along with selected excitation wavelengths.

FIG. 18 shows an example of the absorption spectra of two photoinitiators selected from the group shown in FIG. 16. When excited with the output beam pattern shown in FIG. 17, it can be seen that one photoinitiator has a correspondingly larger absorption at 405 nm than the other. Consequently, the polymer with which this photoinitiator is associated will be cured more readily by 405 nm excitation light than the other. Concomitantly, the other photoinitiator has a greater absorption at 325 nm and so the polymer associated therewith will be cured to a greater extent by 325 nm light.

This differential in polymer curing can, therefore, be used to express one polymer more than the other as required. Continuous optimisation is possible using the precise intensity and wavelength variation across the beam as provided for by the present invention. This can be used to provide a desired refractive index profile across the waveguide. Naturally further tuning can be achieved by using blends of more than two polymers and photoinitiators and, correspondingly, more than two curing beams.

sensitizers

Sensitisation is, in general, the process of energy transfer between a sensitising compound and an initiator compound. The energy levels of the sensitizer and initiator are chosen such that energy transfer occurs from the sensitizer to the initiator once photoexcitation of the sensitizer has occurred.

This is usually achieved by selecting the triplet levels of each compound such that the initiator has a lower triplet level than the sensitizer. Once the excited state is passed on to the photoinitiator, the photoinitiator then produces free radicals and the polymerization reaction can occur. Once the energy transfer from sensitizer to initiator is complete, the sensitizer returns to the ground state and may accept further photons and the process starts again.

The use of a sensitizer enables different excitation wavelengths to be used to excite the same initiator, either directly (via direct absorption) or indirectly (via energy transfer from the sensitizer). The reaction rates in each case will also be different and this will be related to the capture cross section for energy transfer from sensitizer to initiator. These properties can be tuned to provide different levels of curing for different wavelengths of curing light, again providing a mechanism to achieve better refractive index contrast in different sections of the waveguide core 302 as a result of the beam combining method of the present invention.

Two Photon Absorption

The use of multiple radiation beams and/or pulsed laser beams in the present invention can be employed to stimulate weak non-linear absorption effects in the curing of the optical polymer or polymers. One such non-linear process is two-photon absorption. Two-photon absorption (TPA) is a phenomenon whereby two photons of identical or different wavelengths are absorbed by a material exciting a molecule from one state to higher electron state, whereby the energy difference between the two states is equal to the sum of the energies (hυ) of the absorbed photons.

Two-photon absorption is a second order, non-linear optical process which has an absorption cross-section which is significantly smaller than that for single-photon absorption. Therefore, the two-photon absorption effect is several orders of magnitude weaker than linear absorption. In contrast to single photon absorption, the strength of absorption depends on the square of the intensity of light impinging on the material. Therefore, two-photon absorption can, potentially, be used to achieve increased resolution of the curing beam to create smaller, more localised refractive index changes due to curing.

"Writing Parameters for 3D Refractive Index Structures In Polymethyl Methacrylate Using Femtosecond Radiation at 400 nm", Shijie Liang et al., Journal of Laser Micro/Nanoengineering, February 2010 discloses a 1 kHz pulse rate, 100 fs pulse period, 400 nm laser, which is focussed through a high N.A. lens to stimulate non-linear photon absorption in poly(methyl methacrylate) (PMMA), thus creating a localised index change at the focal point where the intensity is many orders of magnitude higher than in the collimated beam. PMMA is a polymer which is only weakly susceptible to this effect and consequently the maximum variation in index change demonstrated in PMMA using this technique is small ($5 \times 10^4$).

However, when this effect is utilised in conjunction with a polymer having greater index change responsivity to 2-photon absorption, which can be enhanced by using an appropriate 2-photon active photoinitiator in the polymer mixture, and with a beam combining arrangement which can deliver greater intensity and wavelength changes across the transverse profile of the curing beam, greater changes in refractive index can be expected. The combination of multiple curing beams with different wavelengths can also stimulate 2 color 2 photon (2C2P) absorption, whereby two photons of different wavelengths $\lambda_1$ and $\lambda_2$ are absorbed to provide an excitation energy $E_{2C2P}$ to the target molecule, as set out in equation 1) below:

$$E_{2C2P} = \frac{hc}{\lambda_1} + \frac{hc}{\lambda_2} \qquad 1)$$

"Two photon absorption cross-sections of common photoinitiators" K. J. Schafer et al., Journal of Photochemistry and Photobiology A: Chemistry 162 (2004) 497-502 discloses the use of two photon absorption in the creation of photopolymerization reactions.

Pre- and Post-Curing Steps

The approaches outlined above could be deployed on pre-cured waveguides which have been thermally or optically cured to create the hardened geometric profiles of the waveguide. Thermal curing is particularly applicable since this approach may lead to a more fixed structure of waveguide without the cross-linking induced by curing radiation. In other words the 3-dimensional shape of the waveguide is first fixed and then, in a subsequent step, varied degrees of cross-linking are introduced so as to produce the desired refractive index profile.

Alternatively, the pre-curing process to create the waveguides and post-curing to create the desired refractive index profiles could be combined into a single manufacturing step, e.g. using multiple writing heads on the same stage, a first to cure the waveguide and a second to profile the index. Preferably the curing of the waveguides and creation of the desired transverse asymmetric refractive index profile is combined into the same curing step involving one curing head emitting an asymmetric intensity profile, wherein the energy of all parts of the curing beam are above a curing intensity threshold, sufficient to cure all parts of the waveguide, while providing an additional asymmetric intensity profile to further modify the refractive index across the waveguide width as required.

Multiple Beam Combining Arrangements

The embodiments described with reference to FIGS. 5 and 11 above utilise a single beam combiner to combine multiple beams. However, practically, there may be a limit to how many beams can be combined accurately and without distortion using a single beam combiner. Therefore, in order to address this issue, it is possible to provide multiple beam combiners within a waveguide fabrication apparatus.

Figure 19:
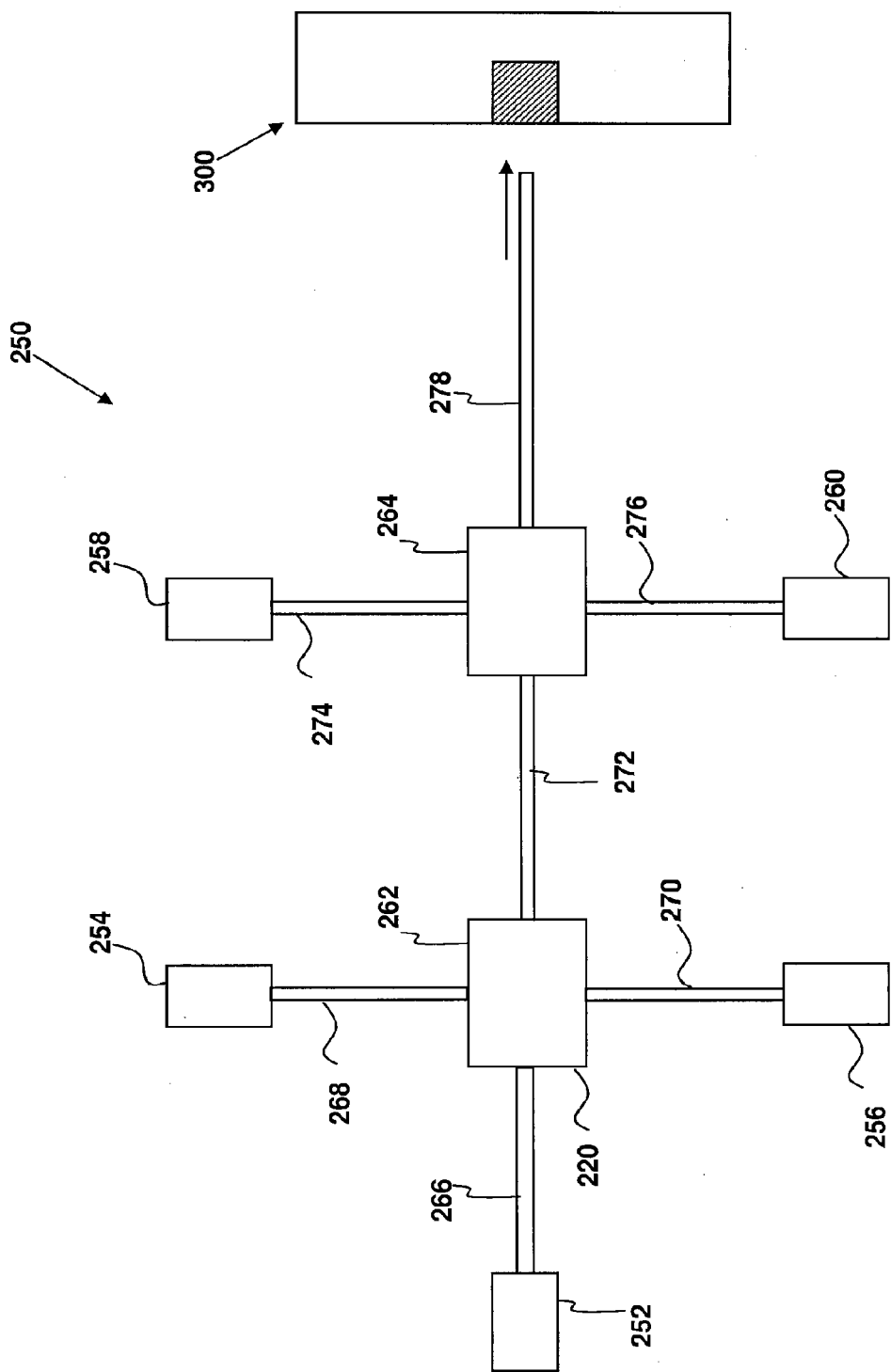
FIG. 19 is a schematic diagram showing a waveguide fabrication apparatus according to a further embodiment of the present invention comprising a plurality of beam combiners.

An example of this is shown in FIG. 19. FIG. 19 shows a waveguide fabrication apparatus 250. The waveguide fabrication apparatus 250 comprises five light sources 252, 254, 256, 258, 260 and first and second beam combiners 262, 264.

The first, second and third light sources 252, 254, 256 generate input beams 266, 268, 270 which are then input into the beam combiner 262. The beam combiner 262 is then operable to combine the input beams 266, 268, 270 from the first, second and third light sources 202, 204, 206 into a single summed beam 272.

The summed beam 272 is then passed into beam combiner 264 wherein the summed beam 272 is combined with input beams 274, 276 output from the fourth and fifth light sources 258, 260 to form a combined output beam 278. The combined output beam 278 is then used to fabricate a suitable waveguide 300.

The advantage of the above arrangement is that a multiplicity of input optical beams can be combined to generate a combined output beam. In other words, the number of input optical beams is not limited by the capacity or accuracy of a single beam combiner. By combining multiple beam combiners to form a single waveguide forming apparatus 250, a large number of input beams can be combined accurately to form a complex combined output beam for curing an arbitrary index profile waveguide.

It is to be noted that, whilst not shown for clarity, beam intensity profilers as shown and described with reference to earlier embodiments could be included in the beam path of any of the input beams 266, 268, 270, 272, 274 as required. Additionally or alternatively, a beam intensity profiler could be included in the beam path from the combined output beam 272 as set out in the embodiments of FIGS. 5 and 11.

FIG. 19 shows a cascaded "daisy-chained" arrangement of beam combiners whereby the output from one beam combiner is passed to one the inputs of a second beam combiner. It should be noted that more beam combiners can be added into such a cascaded chain. An alternative "starred" arrangement is one where separate beam combiners are used to provide each input to the final beam combiner.

A method of operation of the present invention will now be described.

Step 400: Initiate

At step 400, the method is initiated. A sample for processing is placed in the apparatus 100, 200 and the curing process is started. The sample may comprise the desired mixture to form the polymer waveguide 300 on a substrate. The mixture may comprise one or more monomers, oligomers or polymers to be cross-linked to form an optical polymer for use as a waveguide core 302. The mixture may also comprise one or more photopolymerization initiator compounds which are photoactivated to cause polymerization of the monomers and oligomers.

The method then proceeds to step 402.

Step 402: Define Beam Pattern

At step 402, the output beam 116, 222 pattern is defined. In other words, the transverse beam intensity and/or wavelength profile for the output beam 116, 222 is selected. This is selected in dependence upon the desired arbitrary transverse refractive index profile of a particular section of the waveguide 300.

As described previously, the transverse intensity and wavelength profile of the output beam 116, 222 comprises a superposition of the respective input beams 210, 212, 214 intensity and wavelength profiles.

Therefore, by defining the beam intensity profiles using the beam intensity profilers 216, 218, 220, any desired intensity pattern can be obtained.

Furthermore, the intensity distribution can be defined as a function of wavelength. The light sources 202, 204, 206 can be selected depending upon the desired wavelength distribution and may comprise any suitable laser, lamp or LED light source at a desired wavelength.

Examples may comprise Nd:YAG laser emission at 355 nm, a "deep cure" emission at 250 nm or GaN laser emission at 405 nm respectively. In addition, it may be determined whether CW or pulsed laser emission is required to enhance further the refractive index profile as required.

The method then proceeds to step 404.

Step 404: Expose Sample to Output Curing Beam

At step 404, the sample is exposed to the intensity profiled summed output beam 222 for a predetermined time period. Optionally, the sample and/or the writing beam may be positioned on a movable track so that the polymer waveguide 300 is exposed along a length direction thereof. The speed and exposure time could then be selected to appropriately cure specific sections of the waveguide as desired.

Step 406: Complete

At step 406 the curing is completed and the uncured material is developed away in a conventional manner to reveal the desired waveguide structures. Further curing steps, such as thermal curing or developing steps may additionally be implemented should this be required.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. An apparatus, comprising:
   a first light source configured to generate a first curing beam having a first beam intensity profile;
   a second light source configured to generate a second curing beam having a second beam intensity profile;
   a combining element configured to combine the first and second curing beams and form an output curing beam having an output beam intensity profile; and
   an exposure region configured to receive one or more optical materials disposed on a substrate and to expose the optical materials to the output optical beam to cure the optical materials and form an optical waveguide.

2. The apparatus of claim 1, wherein the first curing beam comprises a first wavelength; the second curing beam comprises a second wavelength, the second wavelength being different from the first wavelength; and the output curing beam comprises a summed wavelength profile, wherein the first wavelength is selected to cure one or more of the optical materials and the second wavelength is selected to cure one or more of the optical materials that differ from the one or more optical materials to be cured by the first wavelength.

3. The apparatus of claim 1, wherein the output beam intensity profile is a superposition of the first and second beam intensity profiles.

4. The apparatus of claim 1, further comprising an optical intensity profiler configured to receive the output curing beam.

5. The apparatus of claim 1, further comprising at least one focusing arrangement configured to receive at least one of the first and second curing beams and to collimate or focus the received curing beam to a predetermined region of the optical materials.

6. The apparatus of claim 5, wherein the focusing arrangement comprises a lens arrangement.

7. The apparatus of claim 5, further comprising a first focusing arrangement configured to receive the first curing beam and a second focusing arrangement configured to receive the second curing beam.

8. The apparatus of claim 1, wherein at least one of the first and second curing beams comprises a pulsed laser beam having a pulse frequency and a duty cycle.

9. The apparatus of claim 8, wherein each of the first and second curing beams comprises a pulsed laser beam having a pulse frequency and a duty cycle.

10. The apparatus of claim 9, wherein one or both of the pulse frequency and duty cycle of the first curing beam differs from that of the second curing beam.

11. An apparatus, comprising:
a first light source configured to generate a first curing beam having a first beam intensity profile;
a second light source configured to generate a second curing beam having a second beam intensity profile;
a third light source configured to generate a third curing beam having a third beam intensity profile;
a combining element configured to combine the first, second, and third curing beams and form an output curing beam having an output beam intensity profile; and
an exposure region configured to receive one or more optical materials disposed on a substrate and to expose the optical materials to the output optical beam to cure the optical materials and form an optical waveguide having a predetermined refractive index profile.

12. The apparatus of claim 11, wherein the first curing beam comprises a first wavelength; the second curing beam comprises a second wavelength, the second wavelength being different from the first wavelength; the third curing beam comprises a third wavelength; and the output curing beam comprises a summed wavelength profile of the first, second, and third wavelengths, wherein the first wavelength is selected to cure one or more of the optical materials and the second wavelength is selected to cure one or more of the optical materials that differ from the one or more optical materials to be cured by the first wavelength.

13. The apparatus of claim 12, wherein the third wavelength is different from the first and second wavelengths.

14. The apparatus of claim 11, wherein at least one of the first, second, and third curing beams comprises a pulsed laser beam having a pulse frequency and a duty cycle.

15. The apparatus of claim 11, wherein at least one of the first, second, and third curing beams comprises a plurality of combined laser beams.

16. The apparatus of claim 11, further comprising at least one focusing arrangement configured to receive at least one of the first, second, and third curing beams and to collimate or focus the received curing beam to a predetermined region of the optical materials.

17. The apparatus of claim 11, wherein the beam focusing arrangement comprises a lens arrangement.

* * * * *